United States Patent
Quick et al.

(10) Patent No.: US 6,381,826 B1
(45) Date of Patent: May 7, 2002

(54) PROCESS FOR PRODUCING HIGH QUALITY METALLIC FIBER MESH

(75) Inventors: Nathaniel R. Quick, Lake Mary; Michael Liberman, Deland, both of FL (US)

(73) Assignee: USF Filtration & Separations Group, Inc., Deland, FL (US)

( * ) Notice: Subject to any disclaimer, the term of this patent is extended or adjusted under 35 U.S.C. 154(b) by 0 days.

(21) Appl. No.: 09/950,466

(22) Filed: Sep. 10, 2001

Related U.S. Application Data
(60) Provisional application No. 60/270,360, filed on Feb. 21, 2001.

(51) Int. Cl.⁷ ................................................. B23P 17/00
(52) U.S. Cl. ......................... 29/419.1; 29/424; 29/423
(58) Field of Search ........................... 29/896.6, 896.62, 29/423, 424, 458, 527.2, 419.1

(56) References Cited

U.S. PATENT DOCUMENTS

| | | | |
|---|---|---|---|
| 2,050,298 A | * | 8/1936 | Everett |
| 3,505,039 A | * | 4/1970 | Roberts et al. |
| 3,540,114 A | * | 11/1970 | Roberts et al. |
| 3,698,863 A | * | 10/1972 | Roberts et al. |
| 3,977,069 A | * | 8/1976 | Domaingue, Jr. |
| 3,977,070 A | * | 8/1976 | Schildbach |
| 4,010,004 A | * | 3/1977 | Brown et al. |
| 4,109,709 A | * | 8/1978 | Honda et al. |
| 4,118,845 A | * | 10/1978 | Childbach |
| 4,412,474 A | * | 11/1983 | Hara |
| 4,514,880 A | * | 5/1985 | Vaughn |
| 4,610,926 A | * | 9/1986 | Tezuka |
| 4,677,818 A | * | 7/1987 | Honda et al. |
| 4,771,596 A | * | 9/1988 | Klein |
| 5,525,423 A | * | 6/1996 | Liberman et al. |
| 5,584,109 A | * | 12/1996 | DiGiovanni et al. |
| 5,630,700 A | * | 5/1997 | Olsen et al. |
| 5,707,467 A | * | 1/1998 | Matsumaru et al. |
| 5,722,226 A | * | 3/1998 | Matsumaru |
| 5,802,830 A | * | 9/1998 | Kawatani |
| 5,839,264 A | * | 11/1998 | Uchio |
| 5,888,321 A | * | 3/1999 | Kazama et al. |
| 5,890,272 A | * | 4/1999 | Liberman et al. |
| 5,956,935 A | * | 9/1999 | Katayama et al. |
| 6,112,395 A | * | 9/2000 | Quick et al. ............... 29/419.1 |

* cited by examiner

Primary Examiner—David P. Bryant
(74) Attorney, Agent, or Firm—Knobbe Martens Olson & Bear LLP

(57) ABSTRACT

The process for making fine metallic mesh is disclosed comprising the steps of cladding an array of metallic wires with an array cladding material to provide an array cladding. The array cladding is drawn for reducing the diameter thereof and for reducing the corresponding diameters of each of the metallic wires for producing a clad array of fine metallic fibers within the array cladding. The array cladding is fashioned into a mesh by weaving, braiding, crocheting and the like thereby forming a series of bends in the clad array for reducing interaction between adjacent portions of the array cladding. The array cladding material is removed for producing fine metallic mesh from the array of the fine metallic fibers.

24 Claims, 16 Drawing Sheets

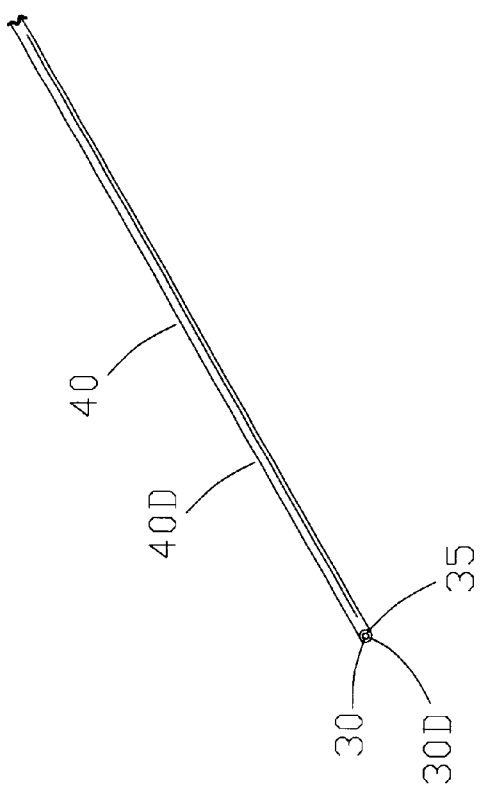
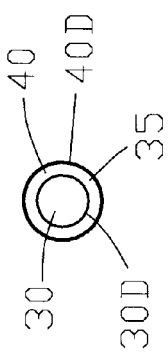
FIG. 3
FIG. 3A
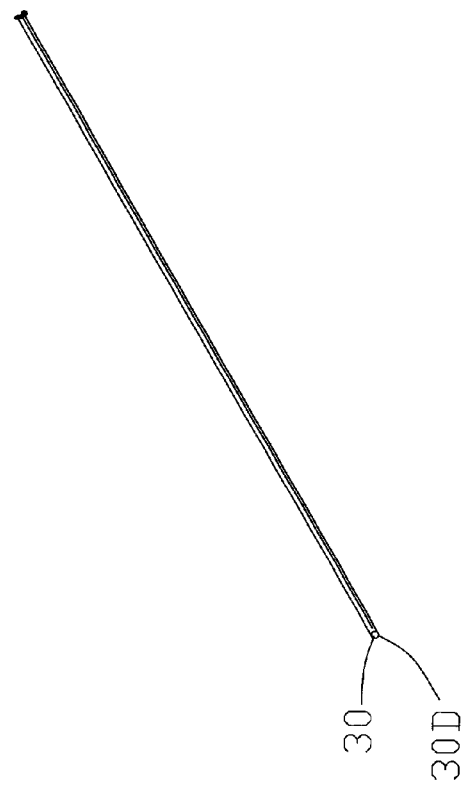
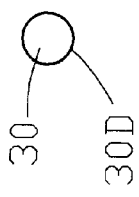
FIG. 2
FIG. 2A

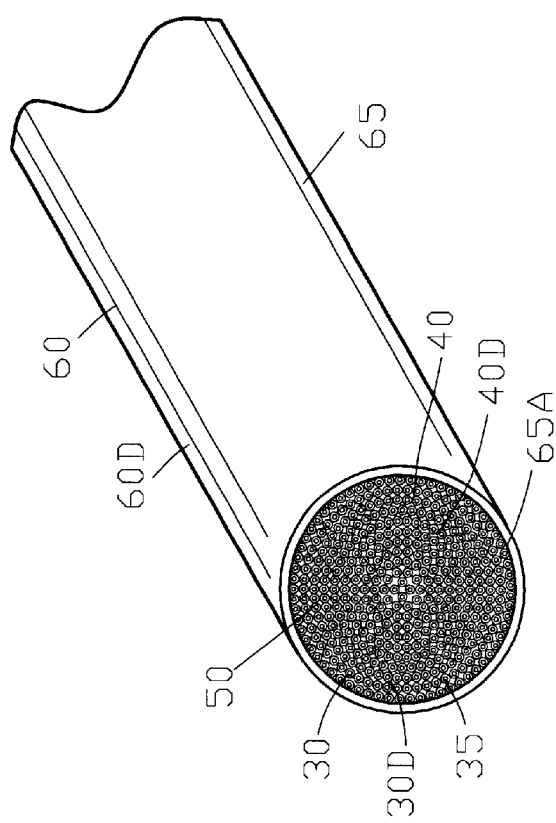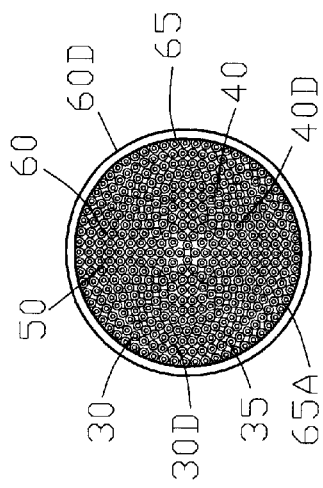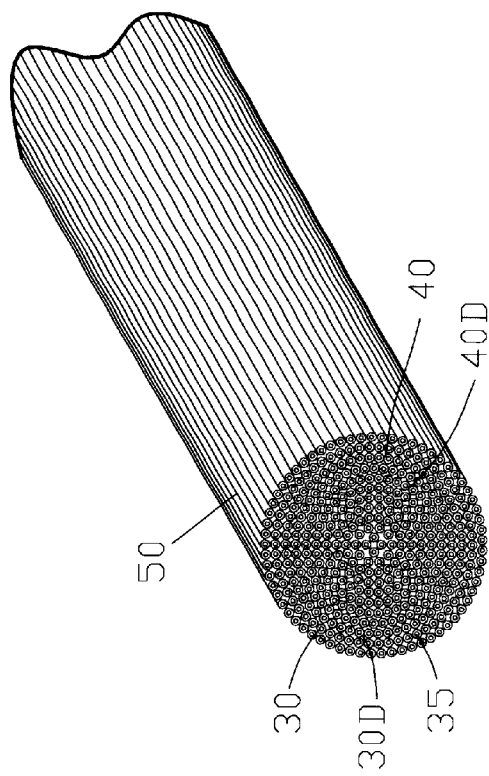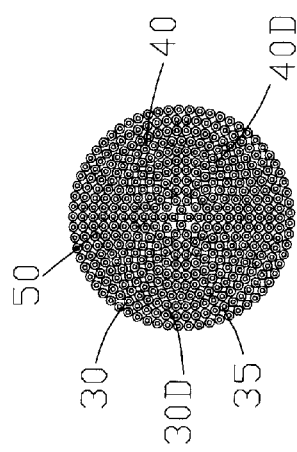
FIG. 5
FIG. 5A
FIG. 4
FIG. 4A

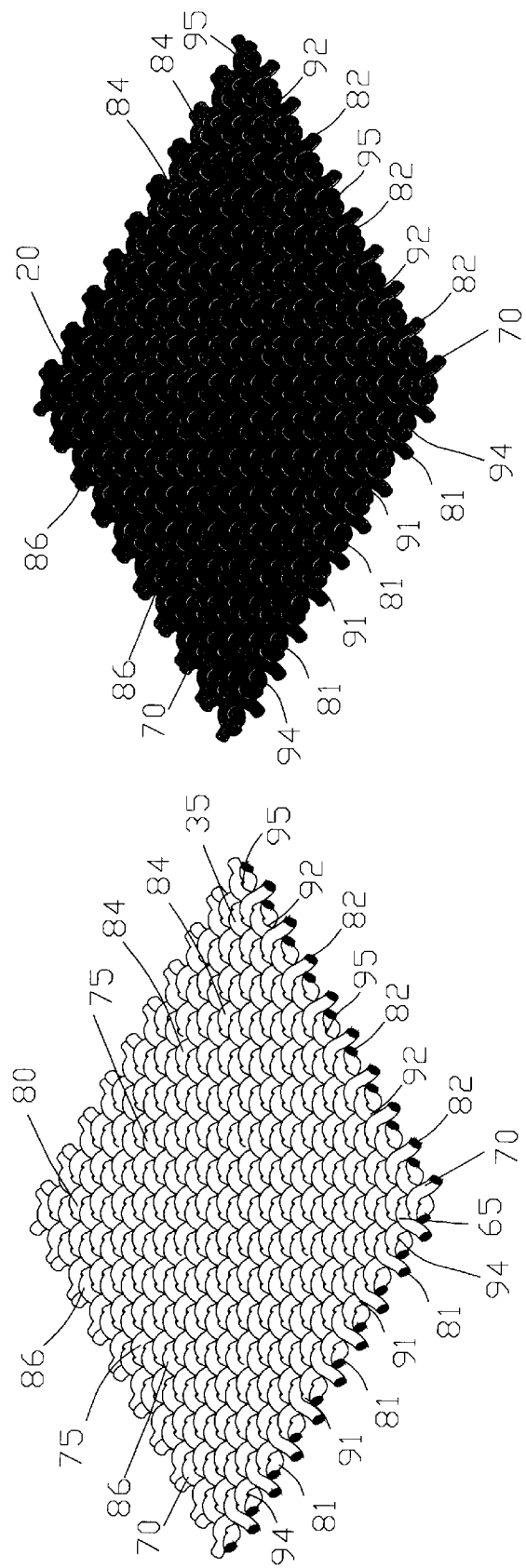

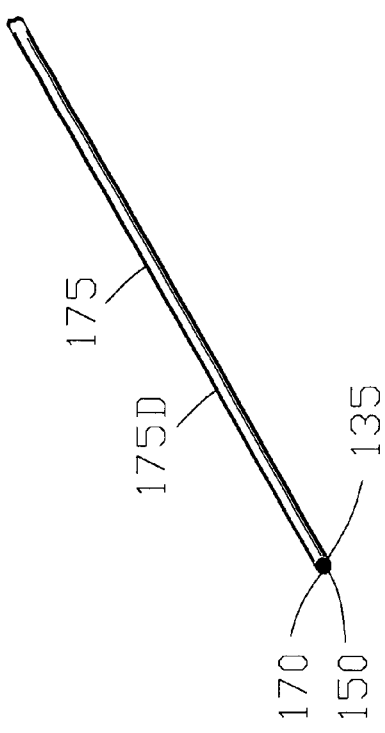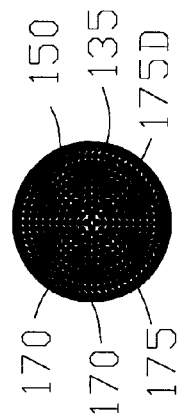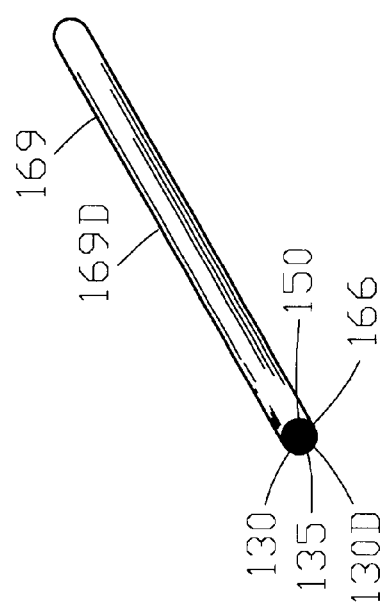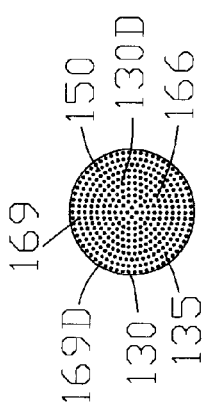
FIG. 18
FIG. 18A
FIG. 17
FIG. 17A

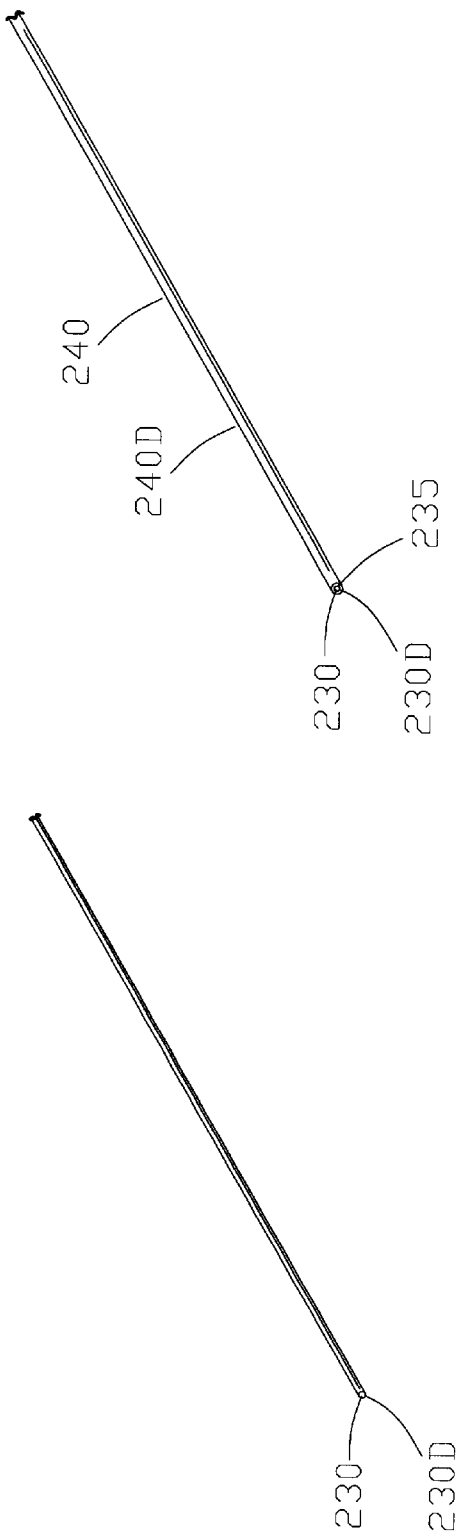
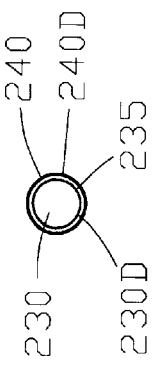
FIG. 23
FIG. 23A
FIG. 22
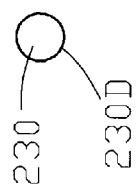
FIG. 22A

PROCESS FOR PRODUCING HIGH QUALITY METALLIC FIBER MESH

CROSS-REFERENCE TO RELATED APPLICATIONS

This application claims benefit of U.S. Patent Provisional application Ser. No. 60/270,360 filed Feb. 21, 2001. All subject matter set forth in provisional application Ser. No. 60/270,360 is hereby incorporated by reference into the present application as if fully set forth herein.

BACKGROUND OF THE INVENTION

1. Field of the Invention

This invention relates to metallic tow or metallic threads and more particularly to an apparatus and method of producing high quality metallic mesh from an array of metallic threads made from fine metallic fibers.

2. Description of the Related Art

This invention relates to metallic mesh or metallic fiber cord and more particularly to an improved apparatus and method of producing high quality metallic mesh or metallic fabric from an array of fine metallic fibers. Metallic mesh is generally formed from a matrix of metallic fiber tow or continuous metallic cord. The metallic fiber tow or continuous metallic cord is characterized as an array of parallel metallic fibers forming a continuous cord of a suitable length. Typically, each of the metallic fibers of the mesh is less than 50 microns in diameter. The metallic fiber tow normally includes continuous metallic fibers in a quantity greater than 19 parallel metallic fibers.

The production of high quality metallic fiber tow is a more difficult task than the production of high quality chopped metallic fibers. Typically, chopped metallic fibers have a length of less than 2 to 3 centimeters. Both metallic fiber tow and metallic chopped fibers are formed in a similar manner. The metallic fibers are formed by cladding an array of metallic wires and drawing the clad array to reduce the outer diameter thereof and to reduce the corresponding diameters of the array of metallic wires thereby producing an array of metallic fibers. The clad array of metallic fibers is chopped into cladding sections of less than two to three centimeters. The chopped cladding sections are placed into a leaching bath to remove the cladding material thereby producing chopped metallic fibers.

The metallic fiber tow is a more difficult task to produce than chopped metallic fibers since clad metallic fiber tow is more difficult to leach than chopped clad metallic fibers. The metallic fiber tow is made in a similar fashion with the exception that the continuous cladding of continuous metallic fibers must be leached as a continuous cladding of metallic fiber tow. The prior art has utilized two methods of leaching the continuous cladding of metallic fiber tow, namely the continuous leaching process and the batch leaching process. In the continuous leaching process, the continuous cladding of metallic fiber tow is passed through a longitudinally extending leaching bath thereby giving a chemical agent sufficient time to remove the cladding material leaving the continuous metallic fiber tow. This process necessitated the use of a long leaching bath, which was unsatisfactory in many cases. Secondly, the continuous cladding of metallic fiber tow had to be pulled through the longitudinally extending leaching tank thereby placing substantial stress on the metallic fiber tow after removal of the cladding material. This substantial stress on the metallic fiber tow resulted in breakage of some of the metallic fibers in the metallic fiber tow thereby reducing the quality thereof.

The second method of leaching the continuous cladding of metallic fiber tow was through a batch process. In the batch process, the continuous cladding of metallic fiber tow was reeled onto a leaching spool and placed in a leaching bath. In order to prevent the individual metallic fibers of one winding of the metallic fiber tow from being entangled with individual metallic fibers of an adjacent winding the continuous cladding of metallic fiber tow was twisted as the continuous cladding of metallic fiber tow was reeled onto the leaching spool.

After the batch leaching process, the continuous cladding of metallic fiber tow was unreeled from the leaching spool and placed on a transport spool or for ultimate use. Unfortunately, the twisting of the continuous metallic fiber tow did not totally prevent the individual metallic fibers of one winding of the metallic fiber tow from being entangled with individual metallic fibers of an adjacent winding of the continuous metallic fiber tow. Accordingly, the unreeling of the continuous metallic fiber tow from the leaching spool resulted in breakage of some of the individual metallic fibers thereby providing poor quality fiber tow.

In some instances, the continuous metallic fiber tow was used in the production of high quality metallic mesh. Many processes have been known in the prior art for the manufacture and production of high quality metallic mesh. Among the prior art that have attempted to provide for the manufacturing and production of high quality metallic fiber tow and/or high quality metallic mesh are the following United States patents.

U.S. Pat. No. 2,050,298 to Everett discloses a process for the production of stranded wire by reduction from elements of comparatively large cross-sections. The process comprises the steps of assembling of a plurality of the elements in side-by-side relationship. The encased assembly of elements is reduced thus formed as a unit and imparting a permanent helical twist to the reduced bundle and then removing the casing.

U.S. Pat. No. 3,505,039 to Roberts et al. discloses a product defined as fine metal filaments, such as filaments of under approximately 15 microns diameter, in long lengths wherein a plurality of sheathed elements are first constricted to form a reduced diameter billet by means of hot forming. After the hot forming constriction, the billet is then drawn to the final size wherein the filaments have the desired final small diameter. The material surrounding the filaments is then removed by suitable means leaving the filaments in the form of a tow.

U.S. Pat. No. 3,540,114 to Roberts et al. discloses a method of forming fine filaments formed of a material such as metal by multiple end drawing a plurality of elongated elements having thereon a thin film of lubricant material. The plurality of elements may be bundled in a tubular sheath formed of drawable material. The lubricant may be applied to the individual elements prior to the bundling thereof and may be provided by applying the lubricant to the elements while they are being individually drawn through a coating mechanism such as a drawing die. The lubricant comprises a material capable of forming a film having a high tenacity characteristic whereby the film is maintained under the extreme pressure conditions of drawing process. Upon completion of the constricting operation, the tubular sheath is removed. If desired, the lubricant may be also removed from the resultant filaments.

U.S. Pat. No. 3,698,863 to Roberts et al. discloses a metallic filament that has an effective diameter of less than 50 microns and is formed while surrounded by a subsequently removed sacrificial matrix. The filament has a preselected peripheral surface varying from substantially smooth to re-entrant and a preselected surface to volume ratio. The area of the filament also has a controlled non-uniformity along the length thereof which provides an acceptable dimensional tolerance. The metallic filament may be substantially one metal, bimetallic or tubular.

U.S. Pat. No. 3,977,069 to Domaingue, Jr. discloses that this invention contemplates a method and apparatus for taking fine metal fibers having a diameter range from 0.5 microns to approximately 150 microns and cutting the fibers into precise short lengths. The method and apparatus comprises first moistening tows of metal fibers and unwinding the tows from spools and positioning them into tow bands. A stiffened ribbon made from the tow bands is cut to the desired precise lengths in order to prevent cold welding or deformation of the ends of the fibers during the cutting operation. Materials that may be used for stiffening the fibers include starch, PCA, ice, etc.

U.S. Pat. No. 3,977,070 to Schildbach discloses the method of forming a tow of filaments wherein a bundle of elongated elements such as rods or wires, is clad by forming a sheath of material different from that of the elements about the bundle. The bundle is subsequently drawn to constrict the elements to a desired small diameter. The elements may be formed of metal. The bundle may be annealed, or stress relived, between drawing steps as desired. The sheath may be formed of metal and may have juxtaposed edges thereof welded together to retain the assembly. The sheath is removed from the final constricted bundle to free the filaments in the form of tow.

U.S. Pat. No. 4,010,004 to Brown et al. discloses a metallic velvet material comprising a woven textile pile fabric wherein at least a portion of the woven base fabric and/or the velvet surface-forming pile yarns is metallic. The metallic yam may comprise a blended yarn formed of staple metal fibers and conventional nonmetallic textile fibers, or may be formed of continuous metal filament material. The metal fibers, or filaments, are preferably formed with rough unmachined and unburnished, fracture-free outer surfaces for improved retention in the velvet pile fabric.

U.S. Pat. No. 4,109,709 to Honda et al. discloses heat pipes comprising an outer tubular material closed at both ends. A wick of metal fibers covering an inner tubular material is inserted in the outer tubular material. A heat transfer volatile liquid is confined in the closed outer tubular material. An evaporation region and a condensing region are respectively constituted in the end portions of the outer tubular material. The liquid in the evaporation region vaporizes when heated and the vapor is passed to the condensing region to condense while giving the heat of the vapor to other materials outside the heat pipe. The condensed liquid is returned to the evaporation region by the capillary action of the wick, thus repeating a cycle of the evaporation and condensation.

U.S. Pat. No. 4,118,845 to Schildbach discloses the method of forming a tow of filaments and the tow wherein a bundle of elongated elements such as rods or wires is clad by forming a sheath of material different from that of the elements about the bundle. The bundle is subsequently drawn to constrict the elements to a desired small diameter. The elements may be formed of metal. The bundle may be annealed, or stress relieved, between drawing steps as desired. The sheath may be formed of metal and may have juxtaposed edges thereof welded together to retain the assembly. The sheath is removed from the final constricted bundle to free the filaments in the form of tow.

U.S. Pat. No. 4,412,474 to Hara discloses a fiber cord comprising a core that is formed by braiding a plurality of strands, each comprising at least one fiber filament of high elongation. An outer layer element is formed around the core by braiding a plurality of strands, each comprising at least one fiber filament of low elongation and high strength. A protective layer element is formed around the outer layer element by braiding a plurality of strands, each comprising at least one fiber of high elongation.

U.S. Pat. No. 4,514,880 to Vaughn discloses a method and machine for forming nonwoven batts containing refractory fibers such as carbon, glass, ceramic or metallic fibers, includes a conveying table provided with scalloped rollers which separate tows of filaments and spread the filaments on a conveying table. A feed roller holds the filaments on the table so that they are conveyed to a rotating lickerin. The lickerin is provided with teeth that grasp the filaments so that a tensile force is applied thereto, thereby breaking the filaments at structurally weak points in the filaments. The fibers are mixed with textile fibers and transferred to a foraminous condenser by blowing the fibers through a duct. The fibers are arranged on the conveyor in a random fashion to form a batt.

U.S. Pat. No. 4,610,926 to Tezuka discloses a reinforcing steel fiber to be mixed in concrete having a shaft portion that has strength as a mother material. There are on both sides of the shaft portion, alternately formed knots expanding in width become increased in width in the direction towards the ends of the fiber while they become decreased in thickness while knots expanding in thickness extend almost uniformly over the full length.

U.S. Pat. No. 4,677,818 to Honda, deceased et al. discloses a composite rope obtained by a process comprising (1) impregnating a fiber core of a reinforcing fiber bundle with a thermosetting resin, (2) coating the outer periphery of the resin-impregnated fiber core with fibers, and (3) curing the thermosetting resin with heat.

U.S. Pat. No. 4,771,596 to Klein discloses a fine heterogeneous hybrid spun yarn blended from electrostatically conductive staple fibers and electrostatically non-conductive staple fibers so that the yarn is electrostatically conductive only over short discrete lengths. When used in pile fabrics, such as carpets, the fine yarn is introduced with at least some of the carpet facing yarns during the carpet making operations. The resultant carpet structure substantially eliminates electrostatic shock to a human walking across the carpet and approaching a ground such as a light switch, radio and another person. Such a carpet does not constitute a dangerous floor covering. The unique heterogeneous hybrid spun blended yarn is achieved by process techniques completely contrary to accepted blending practices.

U.S. Pat. No. 5,525,423 to Liberman et al. discloses an apparatus and method for an improved fabric having plural diameter metallic wires, comprising the drawing of a first cladded metallic wire to provide a first drawn cladding of reduced diameter. The first cladding is separated into a primary portion and a secondary with the secondary portion being drawn to reduce the diameter. A selected mixture of the primary and the secondary portions are cladded to provide a third cladding of reduced diameter. The third cladding is drawn and the claddings are removed to provide a fabric comprising metallic wires having a major diameter and a minor diameter. The fabric may be severed into uniform length to provide slivers of metallic wires having plural diameters. The plural diameter slivers may be used for various purposes including a filter medium or may be encapsulated within polymeric material for providing an electrically conductive metallic layer therein.

U.S. Pat. No. 5,584,109 to DiGiovanni et al. discloses an improved battery plate and method of making for an electric storage battery. The battery plate comprises a plurality of metallic fibers of a single or plural diameters randomly oriented and sintered to provide a conductive battery plate with a multiplicity of pores defined therein. The metallic fibers are formed by cladding and drawing a plurality of metallic wires to provide the fabric. The fabric is severed and the cladding is removed to form metallic fibers. The metallic fibers are arranged into a web and sintered to form the battery plate.

U.S. Pat. No. 5,630,700 to Olsen et al. discloses a turbine nozzle including outer and inner bands having respective mounting therein. A plurality of vanes extends through respective pairs of outer and inner holes in the bands. The vane outer and inner ends are resiliently supported to the bands to allow differential thermal movement therebetween so that the individual vanes float relative to the outer and inner bands to prevent thermal stress failure thereof.

U.S. Pat. No. 5,707,467 to Matsumaru et al. discloses a high elongation compact helical steel cord with a high degree of elongation at break of not less than 5% has a (1×n) structure. The steel cord comprises three or more base wires which are helically preformed at a predetermined pitch and that are twisted in the same direction and at the same pitch so that the ratio P/D of the cord diameter D to the twisting pitch P is in the range of 8–15 with the base wire preforming pitch being shorter than the cord twisting pitch. The finished cord has a helical composite structure with its elongation under a load of 35 kgf/mm$^2$ being 0.71%–1.00% and that under a load of 70 kgf/mm$^2$ being 1.18%–1.57%. A radial tire is reinforced with the steel cord preferably as a steel belt cord. An appartaus for making the steel cord is provided with revolving preformers on the wire introducing portion of a bunching machine such that the bunching machine is rotated in a direction reverse to the rotational direction of the revolving preformers.

U.S. Pat. No. 5,722,226 to Matsumaru discloses a steel cord effective for reinforcing a super-large off-road tire wherein strands made by simultaneously twisting together 3 to 6 steel wires in the same twisting direction with the same pitch length. Each of the steel wires consulting the strands continuously has a small wavy pattern of a pitch length smaller than the lay length of the strands and therefore each of the strands has a compound pattern comprising a wavy pattern formed by the twisting. The small wavy pattern and gap is formed between steel wires each of the strands by the small wavy pattern. The lay length $P_1$ of the strands is defined by the small wavy pattern. The lay length $P_1$ of the steel cord is 8 to 15 times the steel cord diameter D and the elongation on breakage by tension of the steel cord is over 5%.

U.S. Pat. No. 5,802,830 to Kawatani discloses that the present invention relates to a steel cord comprising two core wires and five outer wires each having a diameter larger than that of each core wire and integrally twisted on the core wires, wherein a strand constituted by the five outer wires and the two core wires has an oblong cross-section.

U.S. Pat. No. 5,839,264 to Uchio discloses that the steel cord for reinforcement of an off-road tire has a superior resistance to penetration and durability with respect to sharp objects. It has a 3×3, a 3×4, a 4×3 or a 4×4 structure, an identical cord diameter at all points along the steel cord in a longitudinal direction, a cord lay length equal to from 3.5 to 7.5 times the cord diameter and an elongation at break of at least 4%. The steel cord is made up of element wires, each having a wire diameter of from 0.3 to 0.5 mm and a tensile strength of from 2000 to 3300 Mpa.

U.S. Pat. No. 5,888,321 to Kazama et al. discloses steel wire for making steel cord used in rubber product reinforcement has a tensile strength, Y in N/mm$^2$, such that $Y \geq -1960 d+3920$, wherein d is the wire diameter in mm, and also a flat Vickers hardness distribution in a cross-section perpendicular to a length direction thereof from the surface to the interior, but excluding a central portion having a central portion diameter corresponding to ¼ of the wire diameter. The steel wire is made by a method including wet drawing a carbon steel wire rod material containing 0.80 to 0.89% by weight carbon to a predetermined intermediate diameter and subsequently heat-treating and plating to form a final raw material and then wet drawing the final raw material to form the steel wire. The wet drawing steps are performed with drawing dies, each of which is provided with a drawing hole having a drawing hole diameter $d_1$ and the drawing die has an approach angle $2\alpha$ equal to from 8° to 10° and a bearing length of 0.3 $d_1$. The wet drawing of the final raw material includes a final drawing step performed with a double die and the steel wire immediately after passing through the final drawing die has its temperature controlled so as to be less than 150° C.

U.S. Pat. No. 5,890,272 to Liberman et al. discloses a process for making fine metallic fibers comprising coating a plurality of metallic wires with a coating material. The plurality of metallic wires are jacketed with a tube for providing a cladding. The cladding is drawn for reducing the outer diameter thereof. The cladding is removed to provide a remainder comprising the coating material with the plurality of metallic wires contained therein. The remainder is drawn for reducing the diameter thereof and for reducing the corresponding diameter of the plurality of metallic wires contained therein. The coating material is removed for providing the plurality of fine metallic fibers.

U.S. Pat. No. 5,956,935 to Katayama et al. discloses that the steel wire is made using a carbon steel wire rod material containing 0.70 to 0.75 wt % carbon and has the characteristics that its diameter is 0.10 to 0.40 mm and $Y \geq -1960 d+3580$ [Y: tensile strength (N/mm$^2$), d: diameter (mm)]. Furthermore, the torque decrease factor of the steel wire is less than 7% in a torsion-torque curve in a torsion-torque test wherein forward twisting and then reverse twisting are applied. A preferred steel cord has two steel wires bundled together substantially in parallel and one steel wire is wound around this bundle. This steel cord is made from steel wires having the diameter, tensile strength and toughness characteristics set forth above, and also the ratio B/A of the strength B of the twisted steel cord to the aggregate strength A of the steel wires before they are twisted together into the steel cord is 0.935 or over.

Therefore it is an object of this invention to provide an apparatus and a process for producing high quality metallic mesh from fine metallic threads that eliminates the difficulties in leaching the continuous clad array of metallic fiber tow encountered by the prior art.

Another object of this invention is to provide an apparatus and a process for producing high quality metallic mesh from metallic fiber tow wherein a clad array of metallic fiber tow is formed into a mesh and subsequently is leached to remove the cladding to provide a metallic mesh.

Another object of this invention is to provide an apparatus and a process for producing high quality metallic mesh from a clad array of metallic fiber tow that inhibits the individual fibers of the metallic mesh from being ensnared with adjacent individual metallic fibers of the metallic mesh.

Another object of this invention is to provide an apparatus and a process for producing high quality metallic mesh from high quality metallic tow with minimal broken fibers.

Another object of this invention is to provide an apparatus and a process for producing high quality metallic mesh that is capable of producing high quality metallic mesh in commercial quantities at a reasonable manufacturing cost.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to the process for making fine metallic mesh, comprising the steps of cladding an array of metallic wires with an array cladding material to provide an array cladding. The array cladding is drawn for reducing the diameter thereof and for reducing the corresponding diameters of each of the metallic wires of the array within the array cladding for providing a drawn array cladding of fine metallic fibers. The drawn array of fine metallic fibers is formed into a metallic mesh thereby creating a series of bends in the drawn array cladding for reducing interaction between adjacent portions of the array cladding. The array cladding material is removed for producing the metallic mesh from the array of fine metallic fibers.

In a more specific example of the invention, the step of cladding the array of metallic wires includes cladding a wire with a wire cladding material to provide a wire cladding. An array of the wire claddings is assembled and the assembled array of wire claddings is clad with the array cladding material to provide an array cladding. In one example of the invention, the step of cladding the metallic wires includes electroplating a wire with a wire cladding material to provide a wire cladding. The step of drawing the array cladding may include a multiple drawing and annealing process for producing a drawn array cladding of fine metallic fibers.

In another more specific example of the invention, the step of forming a series of bends in the drawn array cladding includes forming a series of bends along the longitudinal length of the drawn array cladding. The series of bends may be disposed in one dimension or two dimensions perpendicular to a third dimension extending along the longitudinal length of the drawn array cladding.

Preferably, the series of bends in the array cladding includes a continuous periodic series of curves in the array cladding such as a continuous sinusoidal bend in the drawn array cladding. The series of bends minimizes the direct contact between adjacent portions of the drawn array cladding for minimizing interaction between the array of fine metallic fibers after removal of the array cladding material. Preferably, the array cladding material is chemically removed for providing the metallic mesh formed from an array of fine metallic fibers.

In another example of the invention, the invention is incorporated into the process for making a fine metallic mesh from a multiplicity of metallic threads wherein the metallic threads are formed by drawing the array cladding for reducing the diameter thereof and for reducing the corresponding diameters of each of the metallic wires of the array within the array cladding for producing a drawn array cladding of fine metallic fibers to function as a thread for the fine metallic mesh. The threads of the drawn array of fine metallic fibers are formed into a metallic mesh thereby creating a series of bends in the drawn array cladding for reducing interaction between adjacent portions of the array cladding. The threads may be formed into a metallic mesh by weaving or braiding the threads or any suitable textile process. The array cladding material is removed for producing the metallic mesh from the array of fine metallic fibers.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 2 is an isometric view of a metallic wire referred to in FIG. 1;

FIG. 2A is an enlarged end view of FIG. 2;

FIG. 3 is an isometric view of the metallic wire of FIG. 1 after a wire cladding process;

FIG. 3A is an enlarged end view of FIG. 3;

FIG. 4 is an isometric view of an array of the wire claddings of FIG. 3;

FIG. 4A is an end view of FIG. 4;

FIG. 5 is an isometric view of the array of the wire claddings of FIG. 4 after a first array cladding process;

FIG. 5A is an end view of FIG. 5;

FIG. 8 is an isometric view of the drawn array cladding of FIG. 7 after a weaving process;

FIG. 9 is an isometric view similar to FIG. 8 after removal of an array cladding material and a wire cladding material providing the fine metallic mesh formed from the fine metallic fibers;

FIG. 17 is an isometric view similar to FIG. 16 after the total removal of the array cladding material leaving a remainder comprising the wire clad material and the array of wires;

FIG. 17A is an enlarged end view of FIG. 17;

FIG. 18 is an isometric view of the remainder of FIG. 17 after a drawing process;

FIG. 18A is an enlarged end view of FIG. 18;

FIG. 22 is an isometric view of a metallic wire referred to in FIG. 21;

FIG. 22A is an enlarged end view of FIG. 21;

FIG. 23 is an isometric view of the metallic wire of FIG. 22 after a wire cladding process;

FIG. 23A is an enlarged end view of FIG. 23;

Similar reference characters refer to similar parts throughout the several Figures of the drawings.

DETAILED DISCUSSION

Figure 1:
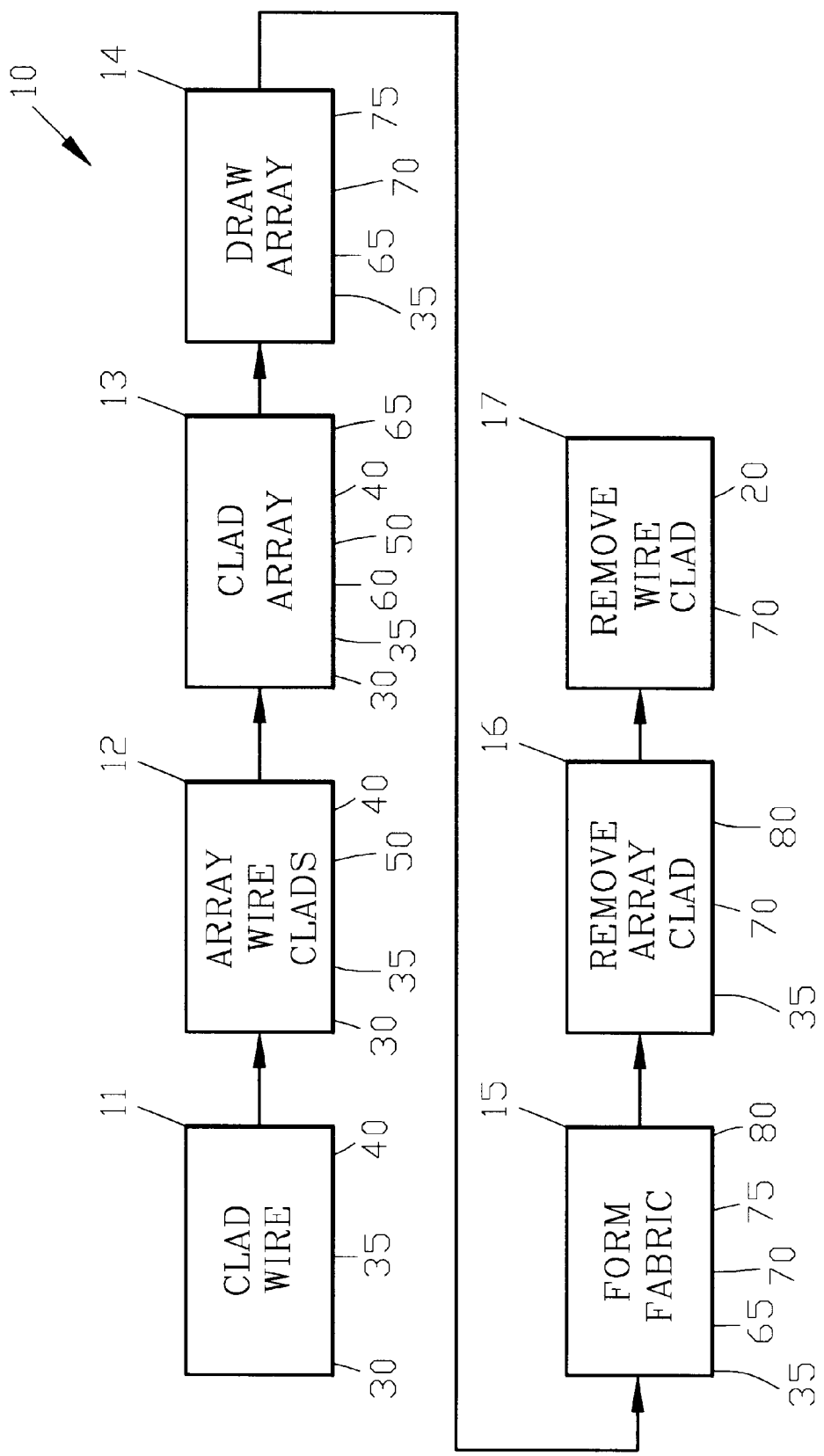
FIG. 1 is a block diagram illustrating a first process for making a fine metallic mesh.

FIG. 1 is a block diagram illustrating a first process 10 for a making mesh 20 such as a fine metallic mesh 20. The process 10 of FIG. 1 comprises providing a metallic wire 30 selected of a material suitable for making the fine metallic mesh 20.

FIGS. 2 and 2A are isometric and end views of the metallic wire 30 referred to in FIG. 1. In this example, the metallic wire 30 is shown as a solid wire having an outer diameter 30D. The metallic wire 30 may be an elemental wire such as nickel, an alloy wire such as stainless steel or inconel, or a composite wire such as copper and stainless steel. In this example, the metallic wire 30 is a stainless steel wire but it should be understood that various types of materials may be used in the process 10 of the present invention.

FIG. 1 illustrates the process step 11 of cladding the metallic wire 30 with a wire cladding material 35 to provide a wire cladding 40. The wire cladding material 35 may be applied to the metallic wire 30 by a conventional cladding process or by an electroplating process.

FIGS. 3 and 3A are isometric and end views of the wire cladding 40 referred to in FIG. 1. The wire cladding material 35 is applied to the outer diameter 30D of the metallic wire 30. The wire cladding 40 defines an outer diameter 40D.

The process of applying the wire cladding material 35 to the metallic wire 30 may be accomplished in various ways. Preferably, the process of applying the wire cladding material 35 to the metallic wire 30 is an electroplating process with the wire cladding material 35 representing approximately ten percent (10%) by weight of the combined weight of the metallic wire 30 and the wire cladding material 35.

In this example, the wire cladding material 35 is a copper material but it should be understood that various types of cladding materials 35 may be used in the process 10.

Another preferred process of applying the wire cladding material 35 to the metallic wire 30 is a conventional cladding process. In a conventional cladding process, a strip of the wire cladding material 35 is bent about the metallic wire 30 with the opposed edges of the strip of the wire cladding material 35 abutting one another. The abutting edges of the strip of the wire cladding 35 are welded to one another. For example, the wire cladding material 35 may be carbon steel.

In another example of the invention, the metallic wire 30 is encased within a preformed tube of the wire cladding material 35 to form the wire cladding 40 having a diameter 40D. The metallic wire 30 is inserted within the preformed tube of the wire cladding 35 to form the wire cladding 40.

FIG. 1 illustrates the process step 12 of assembling an array 50 of a plurality of the wire claddings 40. The array 50 of wire claddings 40 is assembled in a manner suitable for forming an array cladding 60. Preferably, 150 to 3000 of the wire claddings 40 are assembled into the array 50.

FIGS. 4 and 4A are isometric and end views of the assembly 50 of a plurality of the wire claddings 40 after the assembly process 12 of FIG. 1. Preferably, the array 50 of the wire claddings 40 is arranged in a substantially parallel configuration to form the array 50 of the wire claddings 40. In this example, the array 50 of wire claddings 40 is assembled to have a substantially circular cross-section.

FIG. 1 illustrates the process step 13 of cladding the array 50 of the wire claddings 40 to form an array cladding 60. The array 50 of the wire claddings 40 is encased within an array cladding material 65 to form the array cladding 60 having a diameter 60D. The array cladding material 65 may be made of various metallic materials.

FIGS. 5 and 5A are isometric and end views illustrating a first process of cladding the array 50 of the plurality of the wire claddings 40 within the array cladding material 65A to provide the array cladding 60. In this first process of cladding the array 50, the array cladding material 65A is a preformed tube with the array 50 of the wire claddings 40 being inserted within the array cladding material 65A.

Figure 6:
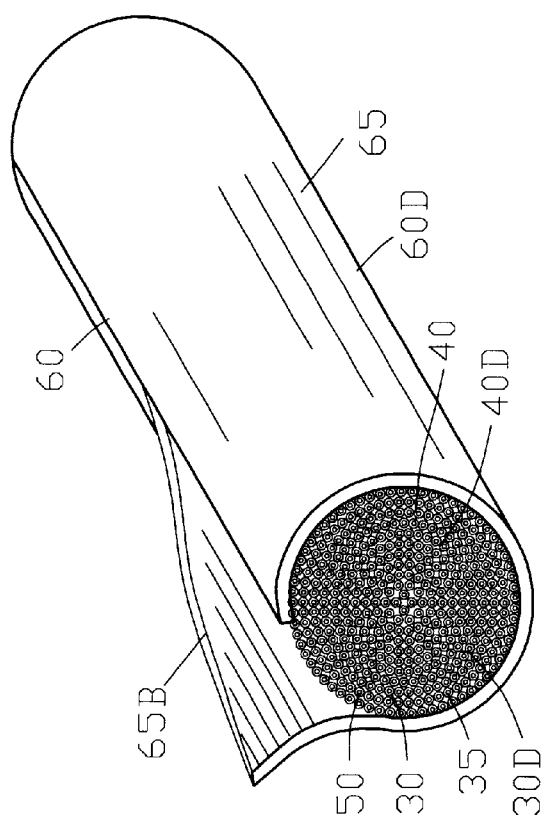
FIG. 6 is an isometric view similar to FIG. 5 illustrating the array of the wire claddings of FIG. 4 after an alternate second array cladding process.
Figure 6A:
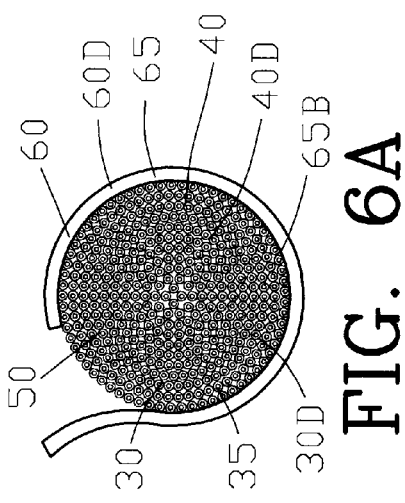
FIG. 6A is an end view of FIG. 6.

FIGS. 6 and 6A are isometric and end views illustrating a second alternative process of cladding the array 50 of the plurality of the wire claddings 40 within the array cladding material 65B to provide the array cladding 60. In this second alternative process of cladding the array 50, a strip of the array cladding material 65B is bent about the array 50 of the wire claddings 40 with opposed edges of the strip of the array cladding material 65B abutting one another. The abutting opposed edges of the strip of the array cladding material 65B are welded to one another. In this example, the array cladding material 65B is made from a material different from the wire cladding material 35.

FIG. 1 illustrates the process step 14 of drawing the array cladding 60. The process step 14 of drawing the array cladding 60 may include multiple drawings and annealing processes for transforming each of the metallic wires 30 within the array cladding material 65 into a fine metallic fiber 70. Furthermore, the process step 14 of drawing the array cladding 60 transforms the array cladding 60 into a clad metallic thread 75.

Figure 7:
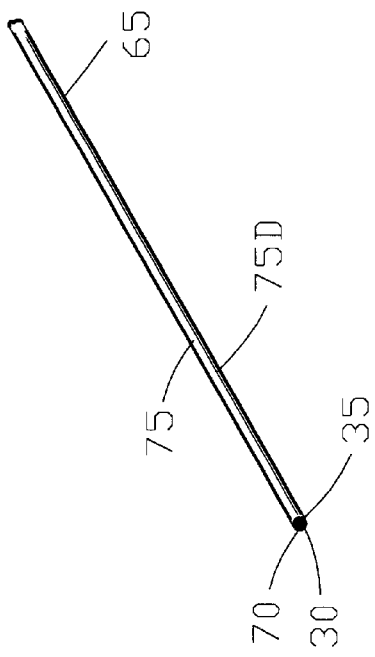
FIG. 7 is an isometric view of the array cladding of FIG. 5 or FIG. 6 after a drawing process to provide a drawn array cladding.
Figure 7A:
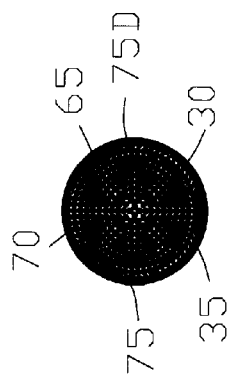
FIG. 7A is an enlarged end view of FIG. 7.

FIGS. 7 and 7A are isometric and end views of the clad metallic thread 75 after the drawing process 14 of FIG. 1. The process step 14 reduces an outer diameter 60D of the array cladding 60 and provides the clad metallic thread 75 having a outer diameter 75D. Furthermore, the process step 14 reduces the corresponding outer diameter 40D of each of the plurality the wire claddings 40 and the corresponding outer diameter 30D of each of the metallic wires 30 to provide the fine metallic fibers 70. The clad metallic thread 75 is used for forming the fine metallic mesh 20.

FIG. 1 illustrates the process step 15 of forming the clad metallic mesh 80 from a multiplicity of clad metallic threads 75. The clad metallic threads 75 may be formed into the clad metallic mesh 80 using any suitable textile process such as weaving, braiding, darning and the like.

FIG. 8 is an isometric view of the clad metallic threads 75 formed into the clad metallic mesh 80. In this example, the multiplicity of clad metallic threads 75 are formed into the clad metallic mesh 80 by a weaving process having a multiplicity of warps 81 and a multiplicity of weaves 82. The weaving process creates a series of bends 84 extending along the longitudinal length of each of the multiplicity of warps 81. Similarly, the weaving process creates a series of bends 86 extending along the longitudinal length of each of the multiplicity of weaves 82.

The multiplicity of weaves 82 are interleaved with the multiplicity of warps 81 to create spaces 91 between each of the adjacent warps 81. Similarly, the multiplicity of warps 81 are interleaved between the multiplicity of weaves 82 to create spaces 92 between each of the adjacent weaves 82. The spaces 91 reduce interaction between adjacent warps 81 whereas the spaces 92 reduce interaction between adjacent weaves 82. The reduced interaction between adjacent warps 81 and between adjacent weaves 82 is a result of the minimized amount of parallel contact between adjacent warps 81 and between adjacent weaves 82.

Each of the multiplicity of warps 81 makes perpendicular contacts 94 with the multiplicity of the weaves 82. Similarly, each of the multiplicity of weaves 82 makes perpendicular contacts 95 with the multiplicity of the warps 81. The perpendicular contacts 94 and 95 reduce interaction between the warps 81 and the weaves 82. The reduced interaction between warps 81 and the weaves 82 is a result of the minimized amount of parallel contact between warps 81 and weaves 82.

FIG. 1 illustrates the process step 16 of removing the array cladding material 65. The process step 16 of removing the array cladding material 65 leaves an array of the fine metallic fibers 70 with each of the fine metallic fibers 70 being clad with the wire cladding material 35.

The array cladding material 65 may be removed in a number of ways including the removal by a chemical or electrochemical removal process. In one example, the clad metallic mesh 80 is immersed into a container for treatment by the chemical or electrochemical removal process. After the removal of the array cladding material 65, the wire cladding material 35 remains about each of the fine metallic fibers 70.

FIG. 1 illustrates the process step 17 of removing the wire cladding material 35 remaining about each of the fine metallic fibers 70. The wire cladding material 35 may be removed in a number of ways including the removal by a chemical or electrochemical removal process. In one example, the clad metallic mesh 80 is immersed into a container for treatment by the chemical or electrochemical removal process.

In an alternative to the present invention, the process step 17 of removing the wire cladding material 35 may be performed serially or concurrently with the process step 16 of removing the array cladding material 65. In this example, the array cladding material 65 and the wire cladding material 35 are immersed into a container for treatment by the chemical or electrochemical removal process. The chemical or electrochemical removal process may first remove the array cladding material 65 and secondly remove the wire cladding material 35. In the alternative the chemical or electrochemical removal process may remove simultaneously the array cladding material 65 and the wire cladding material 35.

FIG. 9 is an isometric view of the fine metallic mesh 20 after the removal of the wire cladding material 35 to form the fine metallic mesh 20. The fine metallic mesh 20 is formed by the multiplicity of warps 81 and the interleaved multiplicity of the weaves 82. Each of the multiplicity of warps 81 and weaves 82 is formed from an array of fine metallic fibers 70.

During the process steps 14–16, the wire cladding material 35 compressed the array 50 of fine metallic fibers 70 into a compacted array 50. After the removal of the wire cladding material 35, each of the fine metallic fibers 70 separates from adjacent fine metallic fibers 70 thereby expanding to reduce the spaces 91 and 92 between the multiplicity of warps 81 and the multiplicity of the weaves 82 to provide a more uniform fine metallic mesh 20. Furthermore, the separation of the fine metallic fibers 70 provides a tighter weave for the fine metallic mesh 20.

Figure 10:
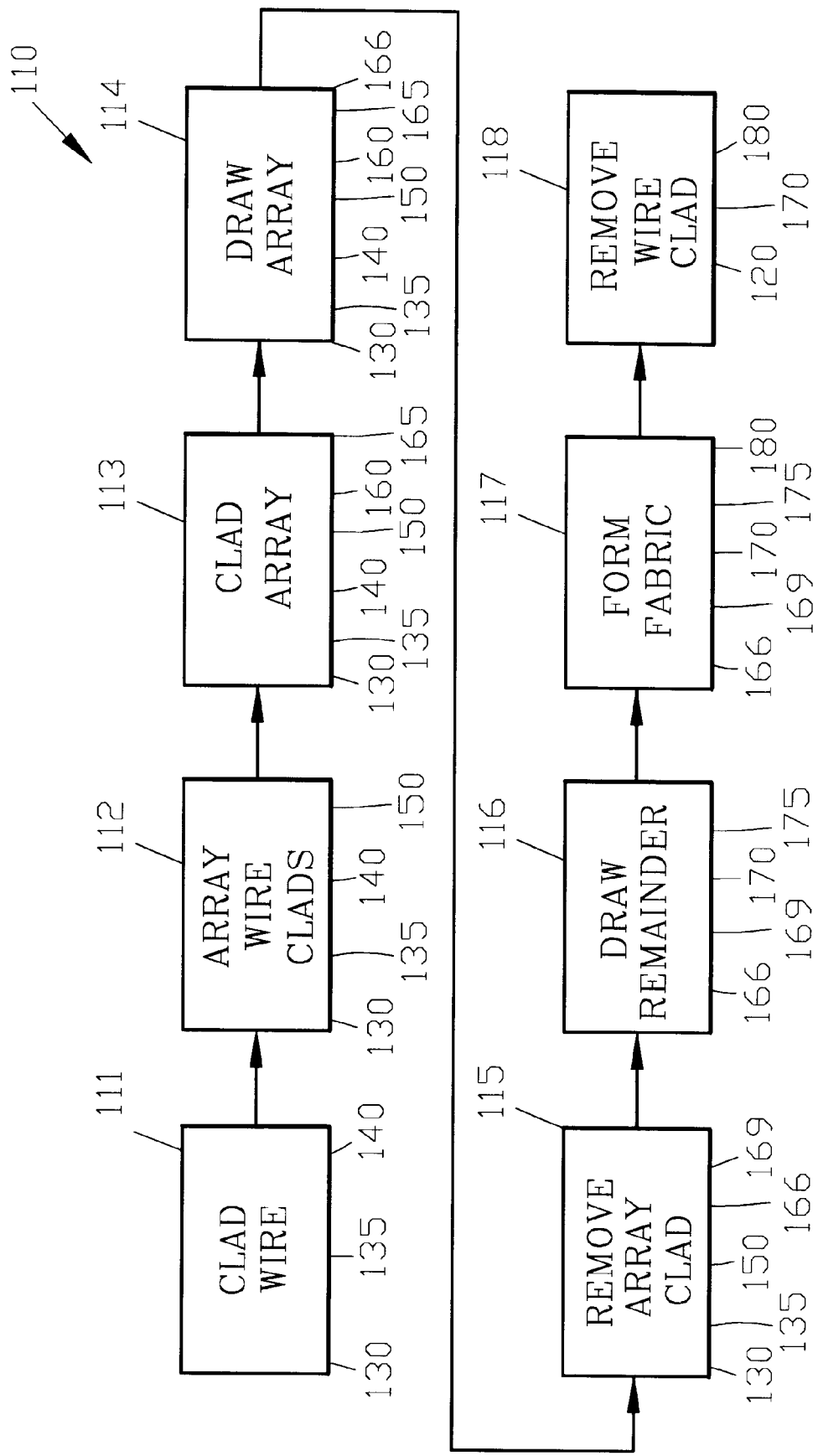
FIG. 10 is a block diagram illustrating a second process for making a fine metallic mesh.

FIG. 10 is a block diagram illustrating a second process 110 for a making a fine metallic mesh 120. The process 110 of FIG. 10 comprises providing a metallic wire 130 selected of a material suitable for making the fine metallic mesh 120.

Figures 11, 11A, 12, 12A:
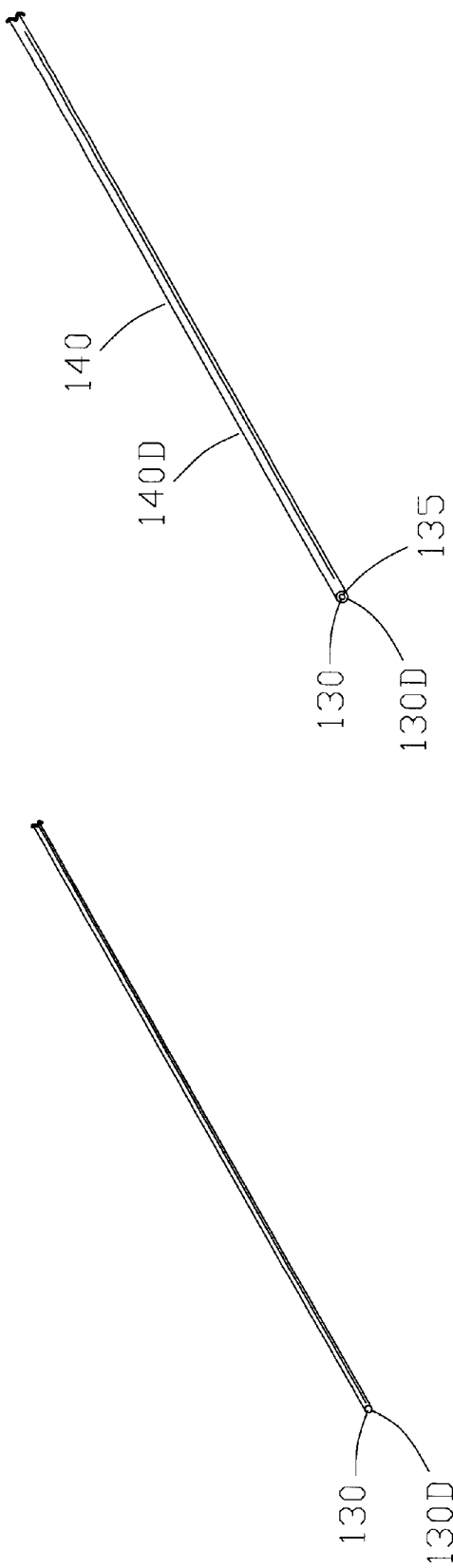
FIG. 11 is an isometric view of a metallic wire referred to in FIG. 10.
FIG. 11A is an enlarged end view of FIG. 11.
FIG. 12 is an isometric view of the metallic wire of FIG. 11 after a wire cladding process.
FIG. 12A is an enlarged end view of FIG. 12.

FIGS. 11 and 11A are isometric and end views of the metallic wire 130 referred to in FIG. 10. In this example, the metallic wire 130 is shown as a solid wire having an outer diameter 130D.

FIG. 10 illustrates the process step 111 of cladding the metallic wire 130 with a wire cladding material 135 to provide a wire cladding 140. The wire cladding material 135 may be applied to the metallic wire 130 by a conventional cladding process or by an electroplating process. In this example, the wire cladding material 135 comprises a coating material 135 applied by an electroplating process.

FIGS. 12 and 12A are isometric and end views of the wire cladding 140 referred to in FIG. 10. The wire coating material 135 is applied to the outer diameter 130D of the metallic wire 130. The wire cladding 140 defines an outer diameter 140D. In this example, the wire coating material 135 is a copper material applied by an electroplating process.

FIG. 10 illustrates the process step 112 of assembling an array 150 of a plurality of the wire claddings 140. Preferably, 150 to 3000 of the wire claddings 140 are assembled into the array 150.

Figure 13:
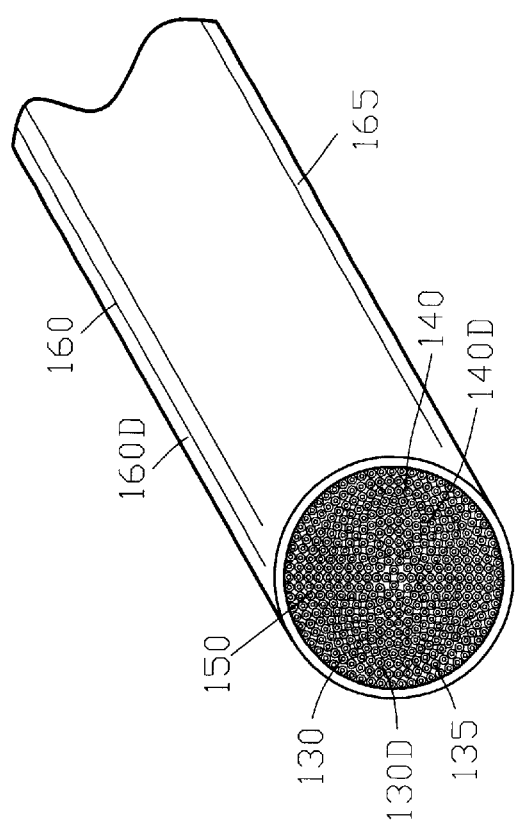
FIG. 13 is an isometric view of the an array of the wire claddings of FIG. 12.
Figure 13A:
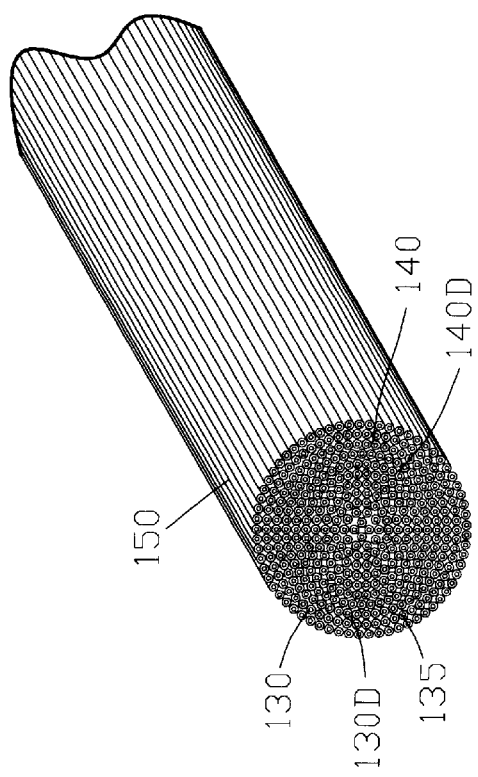
FIG. 13A is an end view of FIG. 13.

FIGS. 13 and 13A are isometric and end views of the array 150 of a plurality of the wire claddings 140 after the assembly process 112 of FIG. 10. Preferably, the array 150 of the wire claddings 140 is arranged in a substantially parallel configuration to form the array 150 of the wire claddings 140.

FIG. 10 illustrates the process step 113 of cladding the array 150 of the wire claddings 140 to form an array cladding 160. The array 150 of the wire claddings 140 is encased within an array cladding material 165 to form the array cladding 160 having a diameter 160D.

Figure 14:
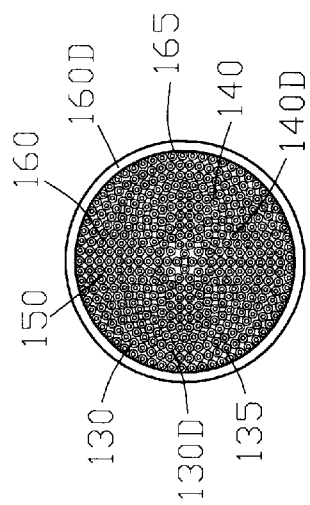
FIG. 14 is an isometric view of the array of the wire claddings of FIG. 13 after an array cladding process.
Figure 14A:
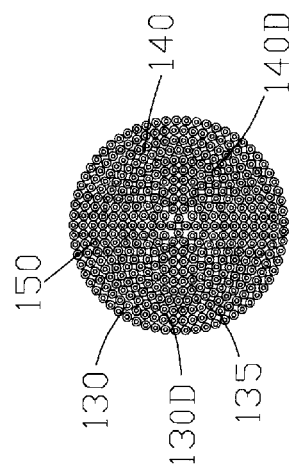
FIG. 14A is an end view of FIG. 14.

FIGS. 14 and 14A are isometric and end views illustrating the process of cladding the array 150 of the plurality of the wire claddings 140 within the array cladding material 165 to provide the array cladding 160. The process of cladding the array 150 may be the process shown in FIG. 5 or the process shown in FIG. 6.

FIG. 10 illustrates the process step 114 of drawing the array cladding 160. The process step 114 of drawing the array cladding 160 may include multiple drawings and annealing processes.

The process step 114 of drawing the array cladding 160 provides three effects. Firstly, the process step 114 reduces an outer diameter 160D of the array cladding 160. Secondly, the process step 114 reduces the corresponding outer diameter 140D of each of the plurality of wire claddings 140 and the corresponding outer diameter 130D of the metallic wires 130. Thirdly, the process step 114 causes the coating materials 135 on each of metallic wires 130 to diffusion weld with the coating materials 135 on adjacent metallic wires 130.

Figure 15:
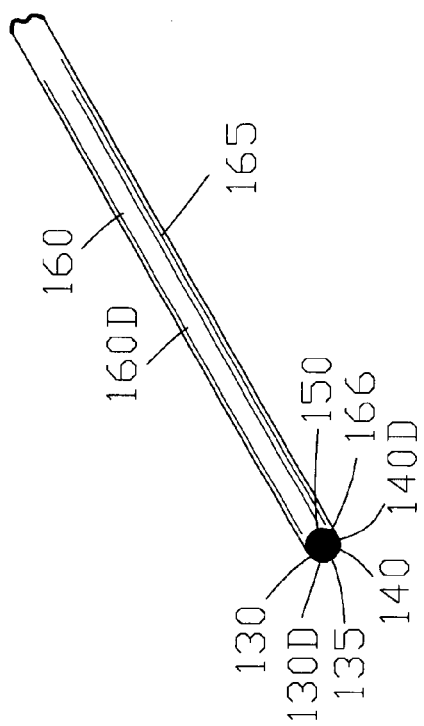
FIG. 15 is an isometric view of the array cladding of FIG. 14 after a drawing process.
Figure 15A:
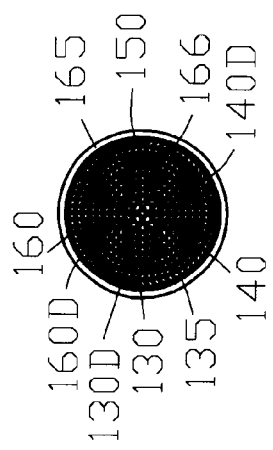
FIG. 15A is an enlarged end view of FIG. 15.

FIG. 15 is an isometric view of the array cladding 160 of FIG. 14 after the drawing process. FIG. 15A is an enlarged end view of FIG. 15. The drawing of the array cladding 160 causes the coating material 135 on each of the plurality of metallic wires 130 to diffusion weld with the coating materials 135 on adjacent plurality of metallic wires 130 to form a unitary material 166. After the diffusion welding of the coating material 135, the coating materials 135 are formed into the substantially unitary material 166 extending throughout the interior of the array cladding 160. The plurality of metallic wires 130 are contained within the unitary material 166 extending throughout the interior of the array cladding 160. Preferably, the coating material 135 is a copper material and is diffusion welded within the array cladding 160 to form the substantially unitary copper material 166 with the plurality of metallic wires 130 contained therein.

FIG. 10 illustrates the process step 115 of removing the array cladding material 165. In the preferred form of the process, the step 115 of removing the array cladding material 165 comprises mechanically removing the array cladding material 165.

Figure 16:
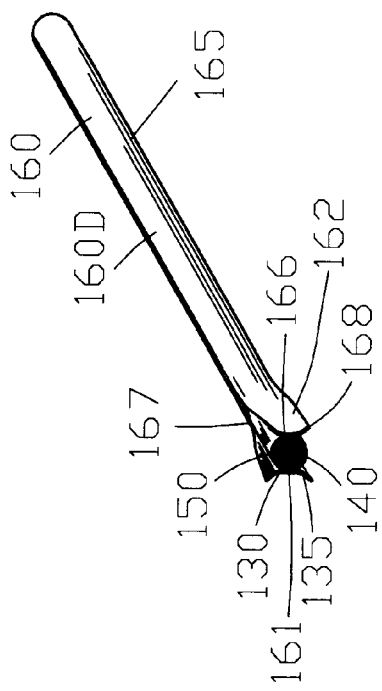
FIG. 16 is an isometric view illustrating the partial removal of the array cladding material of FIGS. 14 and 15.
Figure 16A:
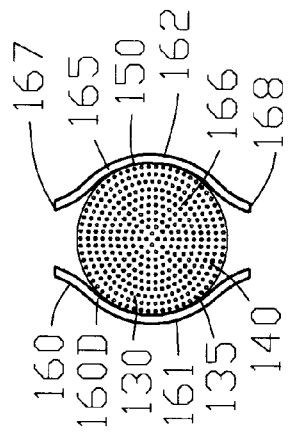
FIG. 16A is an enlarged end view of FIG. 16.

FIG. 16 is an isometric view illustrating the mechanical removal of the array cladding material 165 with FIG. 16A being an enlarged end view of FIG. 16. In one example of this process step 115, the array cladding material 165 is scored or cut at 167 and 168 by mechanical scorers or cutters (not shown). The scores or cuts at 167 and 168 form tube portions 161 and 162 that are mechanically pulled apart to peel the array cladding material 165.

A release material (not shown) may be deposited on the cladding material 165 in a quantity sufficient to inhibit the chemical interaction or bonding between the cladding material 165 and the array 150 of the metallic wires 130 and the coating materials 135.

FIG. 17 is an isometric view illustrating the complete removal of the array cladding material 165 with FIG. 17A being an enlarged end view of FIG. 17. The removal of the array cladding material 165 leaves a remainder 169. The remainder 169 comprises the substantially unitary coating material 166 with the plurality of metallic wires 130 contained therein. The remainder 169 defines an outer diameter 169D.

FIG. 10 illustrates the process step 116 of drawing the remainder 169 for reducing the outer diameter 169D thereof and for reducing the corresponding outer diameter 130D of the array 150 of metallic wires 130 contained therein. The process step 116 of drawing the remainder 169 for transforming the metallic wires 130 within the remainder 169 into fine metallic fibers 170 having a diameter 170D. Furthermore, the process step 116 of drawing the remainder 169 transforms the remainder 169 into a clad metallic thread 175.

FIG. 18 is an isometric view of the array 150 of metallic wires 130 of FIG. 17 reduced into an array of fine metallic fibers 170 by the process step 116 of drawing the remainder 169. The remainder 169 has been transformed into a clad metallic thread 175 having an outer diameter 175D. The clad metallic thread 175 is used for forming the fine metallic mesh 120.

FIG. 18A is an enlarged end view of FIG. 18. The substantially unitary material 166 provides mechanical strength for the array of metallic wires 130 contained therein for enabling the remainder 169 to be drawn without the array cladding material 165. The substantially unitary material 166 enables the remainder 169 to be drawn for reducing the outer diameter 169D thereof and for providing the array of fine metallic fibers 170.

FIG. 10 illustrates the process step 117 of forming the clad metallic mesh 180 from a multiplicity of the clad metallic threads 175. The clad metallic threads 175 may be formed into the clad metallic mesh 180 using any suitable textile process such as weaving, braiding, darning and the like.

Figure 19:
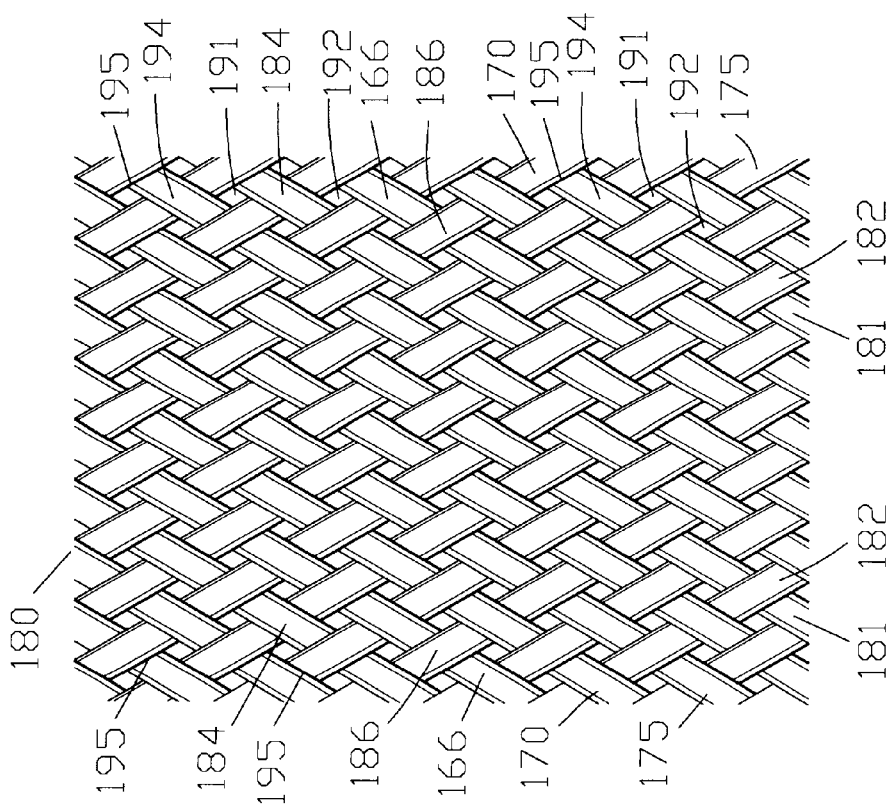
FIG. 19 is an isometric view of the drawn remainder of FIG. 18 after a braiding process.

FIG. 19 is an isometric view of the clad metallic threads 175 formed into the clad metallic mesh 180. In this example, the multiplicity of clad metallic threads 175 are formed into the clad metallic mesh 180 by a braiding process having a multiplicity of first braids 181 and a multiplicity of second braids 182. The braiding process creates a series of bends 184 extending along the longitudinal length of each of the multiplicity of first braids 181. Similarly, the braiding process creates a series of bends 186 extending along the longitudinal length of each of the multiplicity of second braids 182.

The multiplicity of second braids 182 are interleaved with the multiplicity of first braids 181 to create spaces 191 between each of the adjacent first braids 181. Similarly, the multiplicity of first braids 181 are interleaved between the multiplicity of second braids 182 to create spaces 192 between each of the adjacent second braids 182. The spaces 191 reduce interaction between adjacent first braids 181 whereas the spaces 192 reduce interaction between adjacent second braids 182. The reduced interaction between adjacent first braids 181 and between adjacent second braids 182 is a result of the minimized amount of parallel contact between adjacent first braids 181 and between adjacent second braids 182.

Each of the multiplicity of first braids 181 makes angular contacts 194 with the multiplicity of the second braids 182. Similarly, each of the multiplicity of second braids 182 makes angular contacts 195 with the multiplicity of the first braids 181. The angular contacts 194 and 195 reduce interaction between the first braids 181 and the second braids 182. The reduced interaction between first braids 181 and the second braids 182 is a result of the minimized amount of parallel contact between first braids 181 and second braids 182.

FIG. 10 illustrates the process step 118 of removing the unitary coating material 166. The process step 118 of removing the unitary coating material 166 leaves an array of the fine metallic fibers 170. The unitary coating material 166 may be removed in a number of ways including the removal by a chemical or electrochemical removal process. In one example, the clad metallic mesh 180 is immersed into a container for treatment by the chemical or electrochemical removal process.

Figure 20:
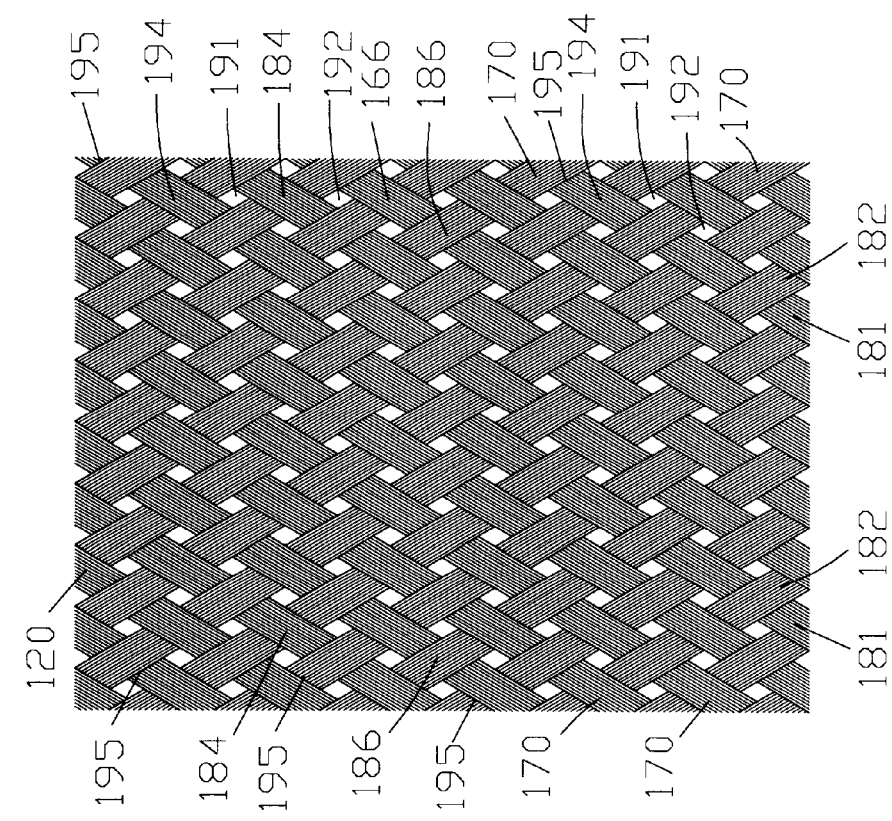
FIG. 20 is an isometric view similar to FIG. 19 after removal of the wire cladding material providing the fine metallic mesh formed from the fine metallic fibers.

FIG. 20 is an isometric view of the fine metallic mesh 120 after the removal of the unitary coating material 166 to form the fine metallic mesh 120. The fine metallic mesh 120 is fabricated by the braiding process and formed from an array of fine metallic fibers 170.

During the process steps 114–117, the unitary coating material 166 compresses the fine metallic fibers 170 into a compacted array 150. After the removal of the unitary coating material 166, each of the fine metallic fibers 170 separates from adjacent fine metallic fibers 170 thereby expanding to provide a more uniform fine metallic mesh 170 and a tighter braiding for the fine metallic mesh 120.

Figure 21:
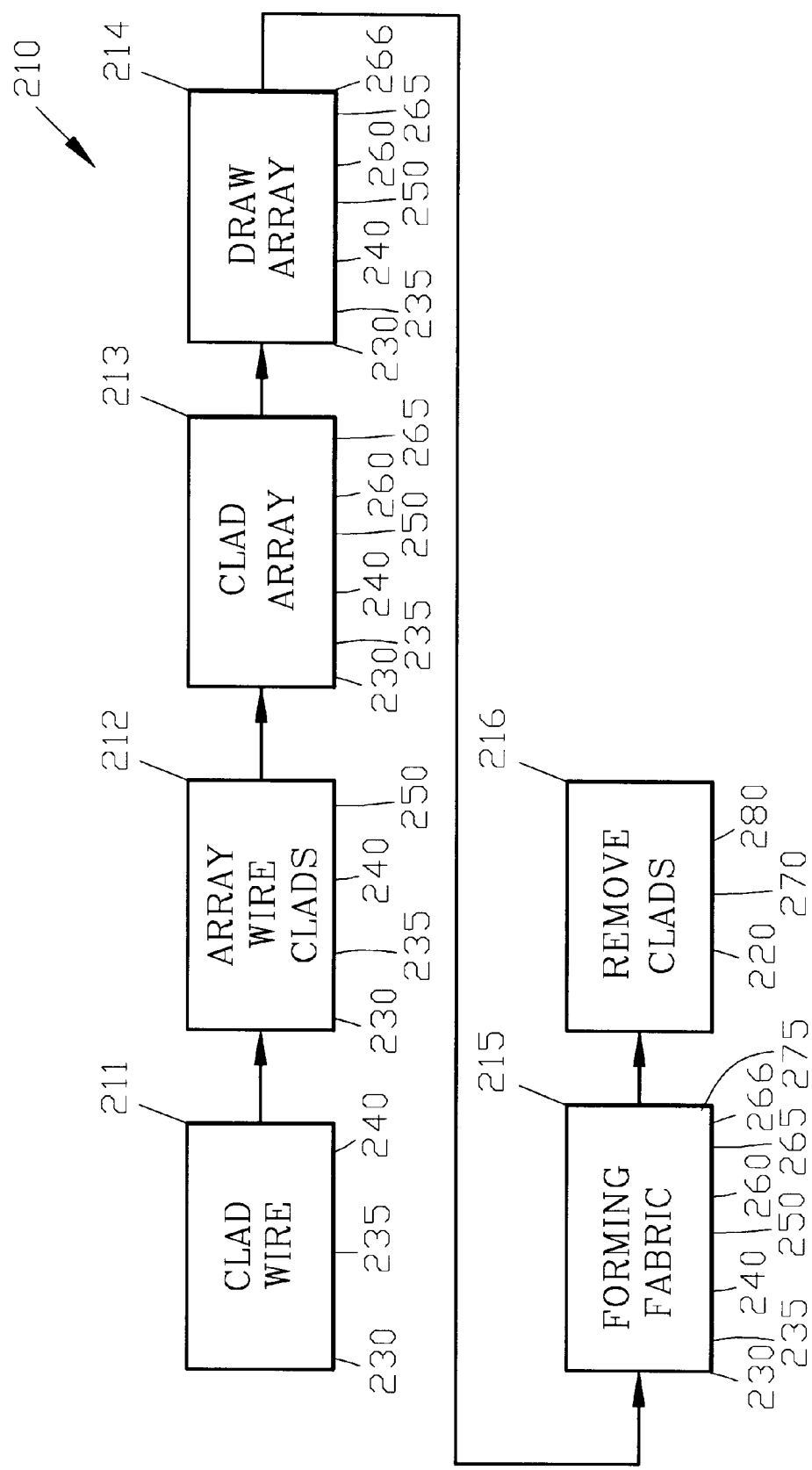
FIG. 21 is a block diagram illustrating a third process for making a fine metallic mesh.

FIG. 21 is a block diagram illustrating a third process 210 for a making a fine metallic mesh 220. The process 210 of FIG. 21 comprises providing a metallic wire 230 selected of a material suitable for making the fine metallic mesh 220.

FIGS. 22 and 22A are isometric and end views of the metallic wire 230 referred to in FIG. 21. In this example, the metallic wire 230 is shown as a solid wire having an outer diameter 230D.

FIG. 21 illustrates the process step 211 of cladding the metallic wire 230 with a wire cladding material 235 to provide a wire cladding 240. In this example, the wire cladding material 235 is a coating material 235 applied by an electroplating process.

FIGS. 23 and 23A are isometric and end views of the wire cladding 240 referred to in FIG. 21. The wire coating material 235 is applied to the outer diameter 230D of the metallic wire 230. The wire cladding 240 defines an outer diameter 240D. In this example, the wire coating material 235 is a copper material applied by an electroplating process.

FIG. 21 illustrates the process step 212 of assembling an array 250 of a plurality of the wire claddings 240. Preferably, 150 to 3000 of the wire claddings 240 are assembled into the array 250.

Figure 24:
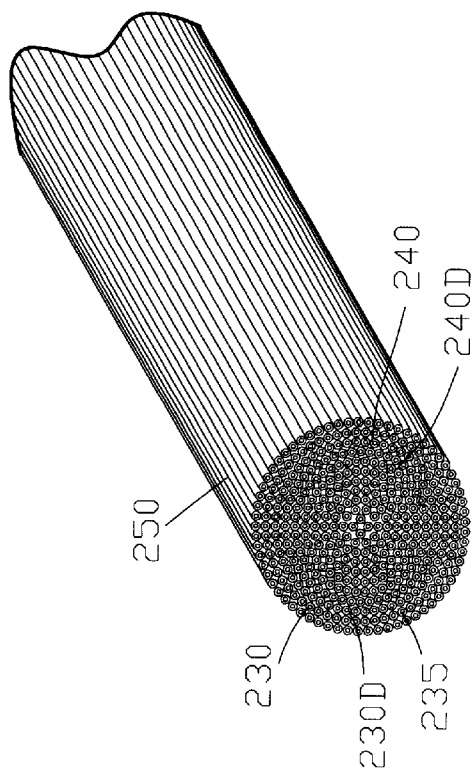
FIG. 24 is an isometric view of the an array of the wire claddings of FIG. 23.
Figure 24A:
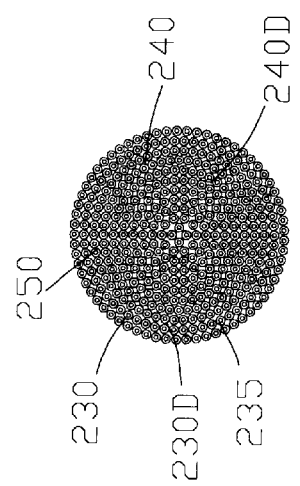
FIG. 24A is an end view of FIG. 24.

FIGS. 24 and 24A are isometric and end views of the array 250 of a plurality of the wire claddings 240 after the assembly process 212 of FIG. 21. Preferably, the array 250 of the wire claddings 240 is arranged in a substantially parallel configuration to form the array 250 of the wire claddings 240.

FIG. 21 illustrates the process step 213 of cladding the array 250 of the wire claddings 240 to form an array cladding 260. The array 250 of the wire claddings 240 is encased within an array cladding material 265 to form the array cladding 260 having a diameter 260D. In this example, the array cladding material 265 is formed from the same type material as the wire coating material 235.

Figure 25:
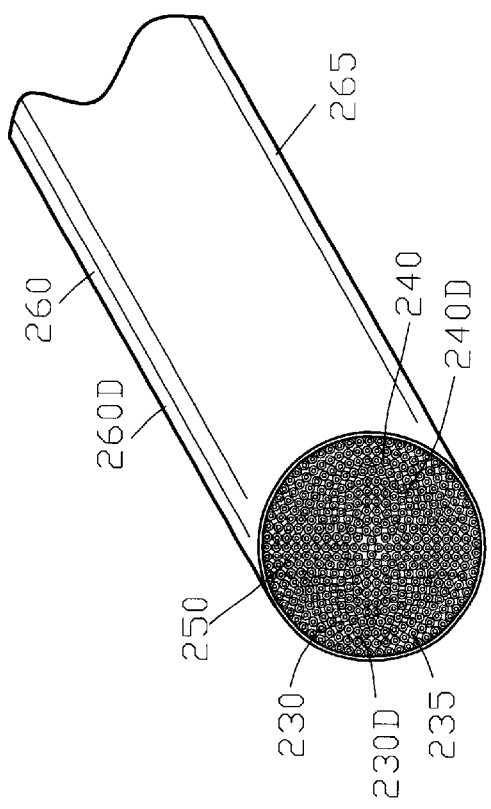
FIG. 25 is an isometric view of the array of the wire claddings of FIG. 24 after an array
Figure 25A:
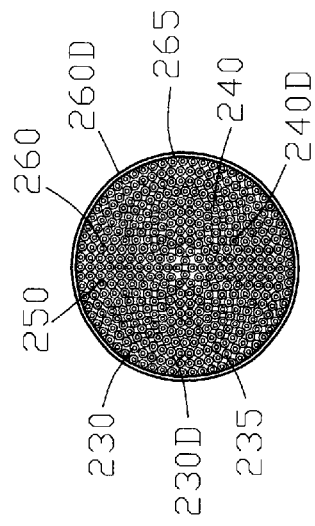
FIG. 25A is an end view of FIG. 25.

FIGS. 25 and 25A are isometric and end views illustrating the process of cladding the array 250 of the wire claddings 240 within the array cladding material 265 to provide the array cladding 260. The process of cladding the array 250 may be the process shown in FIG. 5 or the process shown in FIG. 6.

FIG. 21 illustrates the process step 214 of drawing the array cladding 260. The process step 214 of drawing the array cladding 260 may include multiple drawings and annealing processes. The process step 214 of drawing the array cladding 260 provides four effects. Firstly, the process step 214 reduces an outer diameter 260D of the array cladding 260. Secondly, the process step 214 reduces the corresponding outer diameter 240D of each of the array 250 of wire claddings 240 and the corresponding outer diameter 230D of the metallic wires 230. Thirdly, the process step 214 causes the coating materials 235 on each of metallic wires 230 to diffusion weld with the coating materials 235 on adjacent metallic wires 230. Fourthly, the process step 214 causes the array cladding material 265 to diffusion weld with the coating materials 235 on the metallic wires 230.

Figure 26:
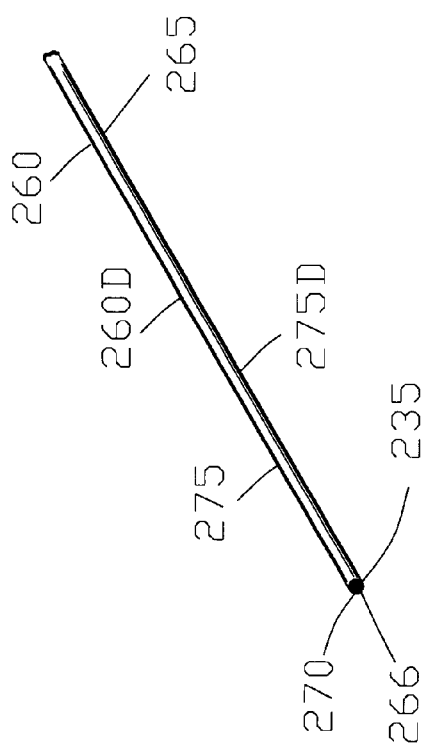
FIG. 26 is an isometric view of the array cladding of FIG. 25 after a drawing process.
Figure 26A:
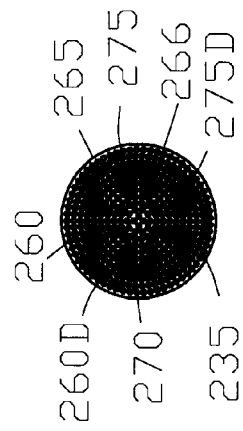
FIG. 26A is an enlarged end view of FIG. 26.

FIG. 26 is an isometric view of the array cladding 260 of FIG. 25 after the drawing process. FIG. 26A is an enlarged end view of FIG. 26. The drawing of the array cladding 260 causes the coating material 235 on each of the plurality of metallic wires 230 to diffusion weld with the coating materials 235 on adjacent plurality of metallic wires 230 to form a unitary material 266. The array cladding material 265 diffusion welds to the coating materials 235 on the metallic wires 230.

Figure 27:
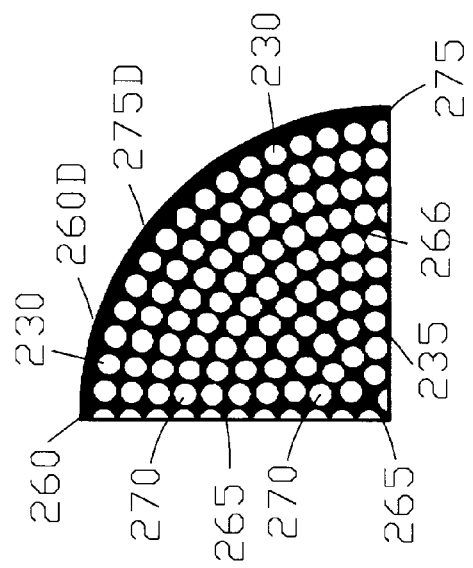
FIG. 27 is a magnified view of a portion of FIG. 26A.

FIG. 27 is a magnified view of a portion of FIG. 26A. After the diffusion welding of the coating material 235 and the array cladding material 265, the coating materials 235 and the array cladding material 265 are formed into the substantially unitary material 266 extending throughout the array cladding 260. The plurality of metallic wires 230 are contained within the unitary material 266 extending throughout the array cladding 260. Preferably, the coating material 235 and the array cladding material 265 is a copper material and is diffusion welded to form the substantially unitary copper material 266 with the plurality of metallic wires 230 contained therein.

The process step 214 of drawing the array cladding 260 reduces the outer diameter 260D thereof and reduces the corresponding outer diameter 230D of the metallic wires 230 contained therein. The process step 214 of drawing the array cladding 260 transforms the metallic wires 230 within the array cladding 260 into fine metallic fibers 270 having a diameter 270D. Furthermore, the process step 214 of drawing the array cladding 260 transforms the array cladding 260 into a clad metallic thread 275 having an outer diameter 275D. The clad metallic thread 275 is used for forming the fine metallic mesh 220.

FIG. 21 illustrates the process step 215 of forming the clad metallic mesh 280 from a multiplicity of the clad metallic threads 275. The clad metallic threads 275 may be formed into the clad metallic mesh 280 any suitable textile process such as braiding, darning and the like.

Figure 28:
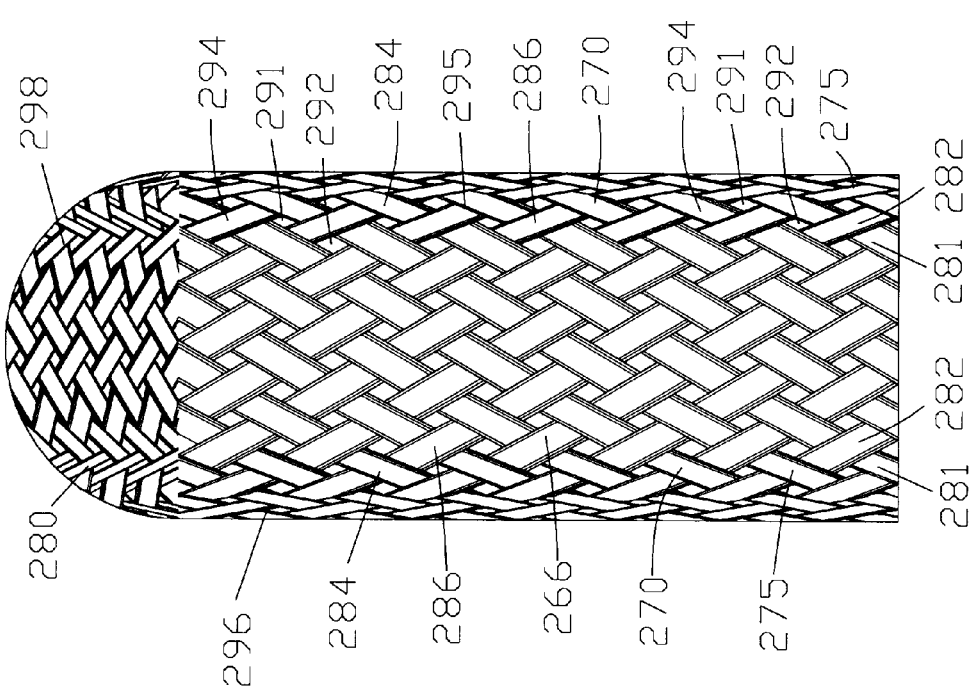
FIG. 28 is an isometric view of the drawn array cladding of FIG. 27 after a process of braiding the drawn array cladding into a specialized shape.

FIG. 28 is an isometric view of the clad metallic threads 275 formed into the clad metallic mesh 280. In this example, the multiplicity of clad metallic threads 275 are formed into the clad metallic mesh 280 by a braiding process having a multiplicity of first braids 281 and a multiplicity of second braids 282. The braiding process creates a series of bends 284 extending along the longitudinal length of each of the multiplicity of first braids 281. Similarly, the braiding process creates a series of bends 286 extending along the longitudinal length of each of the multiplicity of second braids 282.

The multiplicity of second braids 282 are interleaved with the multiplicity of first braids 281 to create spaces 291 between each of the adjacent first braids 281. Similarly, the multiplicity of first braids 281 are interleaved between the multiplicity of second braids 282 to create spaces 292 between each of the adjacent second braids 282. The spaces 291 reduce interaction between adjacent first braids 281 whereas the spaces 292 reduce interaction between adjacent second braids 282. The reduced interaction between adjacent first braids 281 and between adjacent second braids 282 is a result of the minimized amount of parallel contact between adjacent first braids 281 and between adjacent second braids 282.

Each of the multiplicity of first braids 281 makes angular contacts 294 with the multiplicity of the second braids 282. Similarly, each of the multiplicity of second braids 282 makes angular contacts 295 with the multiplicity of the first braids 281. The angular contacts 294 and 295 reduce interaction between the first braids 281 and the second braids 282. The reduced interaction between first braids 281 and the second braids 282 is a result of the minimized amount of parallel contact between first braids 281 and second braids 282.

In this example, the braiding process forms the clad metallic mesh 280 into a specialized shape. In this example, the first braids 281 and second braids 282 of the multiplicity of clad metallic threads 275 are formed into cylinder 296 with a closed hemispherical end 298. The cylinder 296 with the closed hemispherical end 298 may be used as a gas burner for heating gas fired boilers, ovens and furnaces or the like.

The specialized shape has been shown in this example as a cylinder 296 with the closed hemispherical end 298 but it shown be understood that the multiplicity of clad metallic threads 275 may be formed in a wide variety of shapes and sizes.

FIG. 21 illustrates the process step 216 of removing the unitary coating material 266. The process step 216 of removing the unitary coating material 266 leaves an array of the fine metallic fibers 270. The unitary coating material 266 may be removed in a number of ways including the removal by a chemical or electrochemical removal process.

Figure 29:
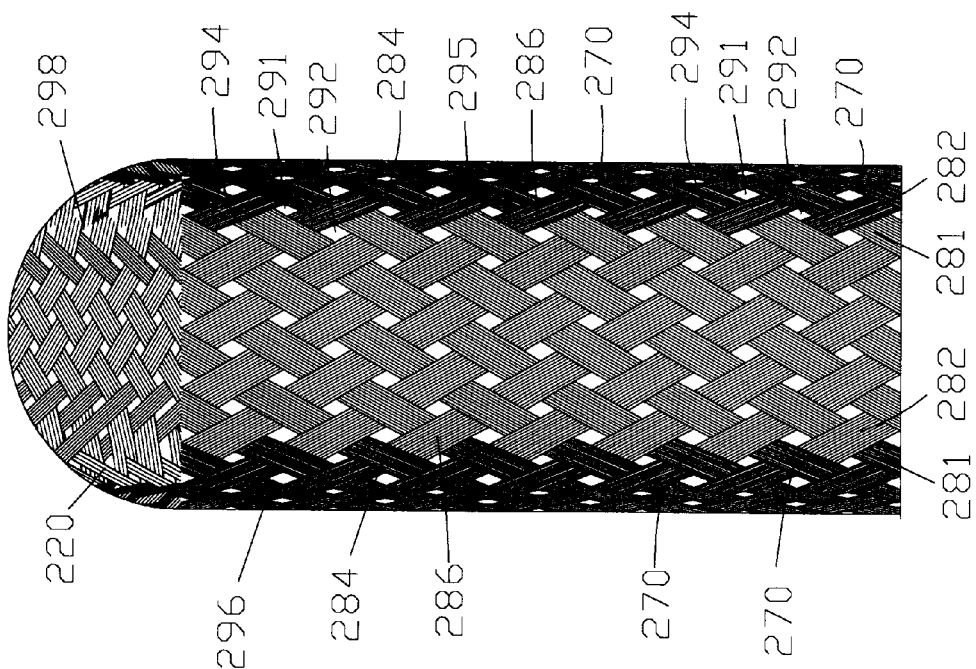
FIG. 29 is an isometric view similar to FIG. 29 after removal of the cladding material providing the fine metallic mesh formed from the fine metallic fibers in a specialized shape.

FIG. 29 is an isometric view of the fine metallic mesh 220 after the removal of the unitary coating material 266 to form the fine metallic mesh 220. After the removal of the unitary coating material 266, each of the fine metallic fibers 270 separates from adjacent fine metallic fibers 270 thereby expanding to provide a more uniform fine metallic mesh 270 and a tighter braid for the fine metallic mesh 220.

The present invention provides a process for making fine metallic mesh suitable fro use as a filter media, catalyst carrier, or any other suitable to a used for such fine metallic mesh. Although the aforementioned specification has been set forth with reference to making the stainless steel fine metallic mesh, it should be understood that the apparatus and process of the invention is suitable for use with a wide variety of metals and types of fibers. It should be understood that various other materials may be used in the present process and that the number and dimensions set forth herein are only by way of example and that once skilled in the art may vary the disclosed process based on the disclosure of the present invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. The process for making fine metallic mesh, comprising the steps of:
   cladding an array of metallic wires with an array cladding material to provide an array cladding;
   drawing the array cladding for reducing the diameter thereof and for reducing the corresponding diameters of each of the metallic wires of the array within the array cladding for providing a drawn array cladding of fine metallic fibers;
   forming the drawn array of fine metallic fibers into a metallic mesh thereby creating a series of bends in the drawn array cladding for reducing interaction between adjacent portions of the array cladding; and
   removing the array cladding material for producing the fine metallic mesh from the array of fine metallic fibers.

2. The process for making fine metallic mesh as set forth in claim 1, wherein the step of
   cladding the array of metallic wires includes cladding a wire with a wire cladding material to provide a wire cladding;
   assembling an array of the wire claddings; and
   cladding the assembled array of wire claddings with the array cladding material to provide an array cladding.

3. The process for making fine metallic mesh as set forth in claim 1, wherein the step of
   cladding the array of metallic wires includes electroplating a wire with a wire cladding material to provide a wire cladding;
   assembling an array of the wire claddings; and
   cladding the assembled array of wire claddings with the array cladding material to provide an array cladding.

4. The process for making fine metallic mesh as set forth in claim 1, wherein the step of
   cladding the assembled array of wire claddings with the array cladding material includes cladding the assembly with an array cladding material identical to the wire cladding material.

5. The process for making fine metallic mesh as set forth in claim 1, wherein the step of
   drawing the array cladding includes a multiple drawing and annealing process for producing a drawn array cladding of fine metallic fibers.

6. The process for making fine metallic mesh as set forth in claim 1, wherein the step of
   forming a series of bends in the drawn array cladding includes forming a series of bends along the longitudinal length of the drawn array cladding.

7. The process for making fine metallic mesh as set forth in claim 1, wherein the step of
forming a series of bends in the array cladding includes forming a continuous periodic series of curves in the array cladding.

8. The process for making fine metallic mesh as set forth in claim 1, wherein the step of
forming a series of bends in the drawn array cladding includes forming a series of bends two dimension perpendicular to a third dimension extending along the longitudinal length of the drawn array cladding.

9. The process for making fine metallic mesh as set forth in claim 1, wherein the step of
forming a series of bends in the drawn array cladding includes forming the series of bends for minimizing the direct contact between adjacent portions of the drawn array cladding for minimizing interaction between the array of fine metallic fibers after removal of the array cladding material.

10. The process for making fine metallic mesh as set forth in claim 1, wherein the step of
forming a series of bends in the drawn array cladding includes forming a continuous sinusoidal bend in the drawn array cladding.

11. The process for making fine metallic mesh as set forth in claim 1, wherein the step of
removing the array cladding material includes chemically removing the array cladding material for providing the metallic mesh formed from an array of fine metallic mesh.

12. The process for making fine metallic mesh, comprising the steps of:
cladding a wire with a wire cladding material to provide a wire cladding;
assembling an array of the wire claddings;
cladding the assembled array of wire claddings with the array cladding material to provide an array cladding;
drawing the array cladding for reducing the diameter thereof and for reducing the corresponding diameters of each of the metallic wires of the array within the array cladding for producing a drawn array cladding of fine metallic fibers;
forming the drawn array of fine metallic fibers into a metallic mesh thereby creating a series of bends in the drawn array cladding for reducing interaction between adjacent portions of the array cladding; and
removing the array cladding material for producing the fine metallic mesh from the array of fine metallic fibers.

13. The process for making fine metallic mesh as set forth in claim 12, wherein the step of
cladding the array of metallic wires includes electroplating a wire with a wire cladding material to provide a wire cladding.

14. The process for making fine metallic mesh as set forth in claim 12, wherein the step of
drawing the array cladding includes a multiple drawing and annealing process for producing a drawn array cladding of fine metallic fibers.

15. The process for making fine metallic mesh as set forth in claim 12, wherein the step of
forming a series of bends in the drawn array cladding includes forming a series of bends along the longitudinal length of the drawn array cladding.

16. The process for making fine metallic mesh as set forth in claim 12, wherein the step of
forming a series of bends in the drawn array cladding creates spaces between adjacent portions of the array cladding to minimize the number of direct contacts between adjacent portions of the array cladding.

17. The process for making fine metallic mesh as set forth in claim 12, wherein the step of
forming a series of bends in the drawn array cladding includes forming the series of bends for minimizing the direct contact between adjacent portions of the drawn array cladding for minimizing interaction between the array of fine metallic fibers after removal of the array cladding material.

18. The process for making fine metallic mesh as set forth in claim 12, wherein the step of
forming a series of bends in the array cladding includes forming a continuous periodic series of curves in the array cladding.

19. The process for making fine metallic mesh as set forth in claim 12, wherein the step of
removing the array cladding material includes chemically removing the array cladding material for providing the fine metallic mesh formed from an array of fine metallic fibers.

20. The process for making fine metallic mesh as set forth in claim 12, wherein the step of
cladding the assembled array of wire claddings with the array cladding material includes cladding the assembly with an array cladding material identical to the wire cladding material.

21. The process for making a fine metallic mesh from a multiplicity of metallic threads, comprising the steps of:
cladding an array of metallic wires with an array cladding material to provide an array cladding;
drawing the array cladding for reducing the diameter thereof and for reducing the corresponding diameters of each of the metallic wires of the array within the array cladding for producing a drawn array cladding of fine metallic fibers to function as a thread for the fine metallic mesh;
forming the threads of the drawn array of fine metallic fibers into a metallic mesh thereby creating a series of bends in the drawn array cladding for reducing interaction between adjacent portions of the array cladding; and
removing the array cladding material for producing the metallic mesh from the array of fine metallic fibers.

22. The process for making a fine metallic mesh from a multiplicity of metallic threads as set forth in claim 21, wherein the step of forming the threads of the drawn array of fine metallic fibers into a metallic mesh includes weaving the threads of the drawn array of fine metallic fibers into the metallic mesh.

23. The process for making a fine metallic mesh from a multiplicity of metallic threads as set forth in claim 21, wherein the step of forming the threads of the drawn array of fine metallic fibers into a metallic mesh includes braiding the threads of the drawn array of fine metallic fibers into the metallic mesh.

24. The process for making a fine metallic mesh from a multiplicity of metallic threads as set forth in claim 21, wherein the step of forming the threads of the drawn array of fine metallic fibers into a metallic mesh includes darning the threads of the drawn array of fine metallic fibers into the metallic mesh.

* * * * *